(12) United States Patent
Tsumekawa

(10) Patent No.: US 8,885,231 B2
(45) Date of Patent: Nov. 11, 2014

(54) ILLUMINATION APPARATUS, IMAGE SENSOR UNIT, IMAGE READING APPARATUS, AND IMAGE FORMING APPARATUS

(71) Applicant: Canon Components, Inc., Saitama (JP)

(72) Inventor: Yoshihiko Tsumekawa, Saitama (JP)

(73) Assignee: Canon Components, Inc. (JP)

( * ) Notice: Subject to any disclaimer, the term of this patent is extended or adjusted under 35 U.S.C. 154(b) by 0 days.

(21) Appl. No.: 13/853,190

(22) Filed: Mar. 29, 2013

(65) Prior Publication Data
US 2013/0258426 A1 Oct. 3, 2013

(30) Foreign Application Priority Data

Mar. 30, 2012 (JP) .................. 2012-081882
Mar. 25, 2013 (JP) .................. 2013-062386

(51) Int. Cl.
| | | |
|---|---|---|
| H04N 1/04 | (2006.01) | |
| H04N 1/46 | (2006.01) | |
| G02B 6/00 | (2006.01) | |
| F21V 7/04 | (2006.01) | |
| F21V 1/00 | (2006.01) | |
| G03B 27/00 | (2006.01) | |
| F21V 8/00 | (2006.01) | |
| H04N 1/028 | (2006.01) | |

(52) U.S. Cl.
CPC .......... *G02B 6/0031* (2013.01); *H04N 1/02895* (2013.01); *H04N 1/028* (2013.01); *G02B 6/001* (2013.01)
USPC ........... 358/475; 358/474; 358/484; 358/509; 385/133; 362/612; 362/235; 362/616; 355/1

(58) Field of Classification Search
USPC ........... 358/484; 385/133; 362/612, 235, 616; 355/1
See application file for complete search history.

(56) References Cited

U.S. PATENT DOCUMENTS

| | | | | |
|---|---|---|---|---|
| 4,544,258 | A | * | 10/1985 | Takano .............................. 355/1 |
| 8,488,216 | B2 | * | 7/2013 | Sakamoto et al. ............ 358/475 |
| 2009/0201675 | A1 | | 8/2009 | Onishi et al. |
| 2010/0214803 | A1 | * | 8/2010 | Sakamoto et al. ............ 362/612 |

FOREIGN PATENT DOCUMENTS

| | | |
|---|---|---|
| JP | 11-185516 A | 7/1999 |
| JP | 2007-235441 A | 9/2007 |
| JP | 2008-270885 A | 11/2008 |
| JP | 2009-021158 A | 1/2009 |
| JP | 2009-117186 A | 5/2009 |

OTHER PUBLICATIONS

Office Action issued in corresponding Japanese Patent application No. 2013-062386 dated Mar. 18, 2014. English language summary is attached to the JPOA.

* cited by examiner

*Primary Examiner* — Charlotte M Baker
*Assistant Examiner* — Rury Grisham
(74) *Attorney, Agent, or Firm* — Rossi, Kimms & McDowell LLP

(57) ABSTRACT

Provided are: a light source that emits light; a light guide including: a curved portion including a light incident surface from which the light from the light source enters; and a linear portion including a light emission surface from which the light is emitted to an original, the linear portion coupled to the curved portion and extended in a main-scan direction, the curved portion reflecting the light entered from the light incident surface to the linear portion; and a frame that houses the light source, and the light guide, wherein the light guide includes an inclined portion inclined in a direction that increases an incident angle β of the light, the inclined portion formed in a range of the linear portion where the light reflected by the curved portion enters.

19 Claims, 19 Drawing Sheets

ILLUMINATION APPARATUS, IMAGE SENSOR UNIT, IMAGE READING APPARATUS, AND IMAGE FORMING APPARATUS

CROSS-REFERENCE TO RELATED APPLICATIONS

This application is based upon and claims the benefit of priority of the prior Japanese Patent Application No. 2012-081882, filed on Mar. 30, 2012, and the Japanese Patent Application No. 2013-062386, filed on Mar. 25, 2013, the entire contents of which are incorporated herein by reference.

BACKGROUND OF THE INVENTION

1. Field of the Invention

The present invention relates to an illumination apparatus, an image sensor unit, an image reading apparatus, and an image forming apparatus. More particularly, the present invention relates to a scanner, a copying machine, and a compound machine as an image reading apparatus or an image forming apparatus and to an illumination apparatus and an image sensor unit used in the image reading apparatus, the image forming apparatus, and the like.

2. Description of the Related Art

A light-guide type illumination apparatus is known as an illumination apparatus used in an image sensor unit.

More specifically, light emitted by a light source provided on an end face in a longitudinal direction of a light guide formed in a rod shape is reflected and diffused in the light guide and propagated through the light guide, and the light is shaped into a line and emitted from an emission surface. In this way, the light is uniformly emitted in a main-scan direction of an original.

However, there is a problem that a dedicated light source according to the position and the shape of the light guide needs to be used to provide the light source on the end face in the longitudinal direction, and this increases the cost.

Therefore, for example, Japanese Laid-open Patent Publication No. 2009-117186 discloses an image sensor module including a light guide with a combination of a pyramid portion and a flat portion, the light guide including a light incident surface, an inclined surface, a light reflection surface, and a light emission surface. This allows using a general, inexpensive surface-mount light source.

The light guide can reflect light, which has entered from a direction different from the longitudinal direction of the light guide, in the longitudinal direction of the light guide based on the inclined surface and then emit the light from the light emission surface.

In the image sensor unit, illuminance of the light emitted from the light guide to the original needs to be uniform in the longitudinal direction of the light guide. However, the light may be leaked around the inclined surface when the light entered from the direction different from the longitudinal direction of the light guide is reflected in the longitudinal direction of the light guide based on the inclined surface as in the light guide of Japanese Laid-open Patent Publication No. 2009-117186.

SUMMARY OF THE INVENTION

The present invention has been made in view of the foregoing problem, and an object of the present invention is to provide an image sensor unit as well as an image reading apparatus and an image forming apparatus, to which the image sensor unit is applied, that can uniformly emit light throughout a longitudinal direction of a light guide even in the use of the light guide that can reflect light, which has entered from a direction different from the longitudinal direction of the light guide, in the longitudinal direction of the light guide and then emit the light from a light emission surface.

To solve the problem, the present invention provides an illumination apparatus that emits light to an object to be read, the illumination apparatus including: a light source that emits light; and a light guide including: a curved portion including a light incident surface from which the light from the light source enters; and a linear portion including a light emission surface from which the light is emitted to the object to be read, the linear portion coupled to the curved portion and extended in a main-scan direction, the curved portion reflecting the light entered from the light incident surface to the linear portion, wherein the light guide includes an inclined portion inclined in a direction that increases an incident angle of the light, the inclined portion formed in a range of the linear portion where the light reflected by the curved portion enters.

DETAILED DESCRIPTION OF THE PREFERRED EMBODIMENTS

Embodiments of the present invention will now be described in detail with reference to the drawings. The embodiments provide an image sensor unit as well as an image reading apparatus and an image forming apparatus to which the image sensor unit is applied. In the following description, three-dimensional directions will be indicated by X, Y, and Z arrows. The X direction denotes a main-scan direction, the Y direction denotes a sub-scan direction perpendicular to the main-scan direction, and the Z direction denotes a vertical direction. The image sensor unit according to the embodiments can read an image of an original P while moving in the sub-scan direction relative to the original P as an object to be read. Therefore, the Y direction is a relative movement direction of the image sensor unit and the original P.

The object to be read is not limited to the original P, and other objects to be read are also possible.

First Embodiment

Figure 2:
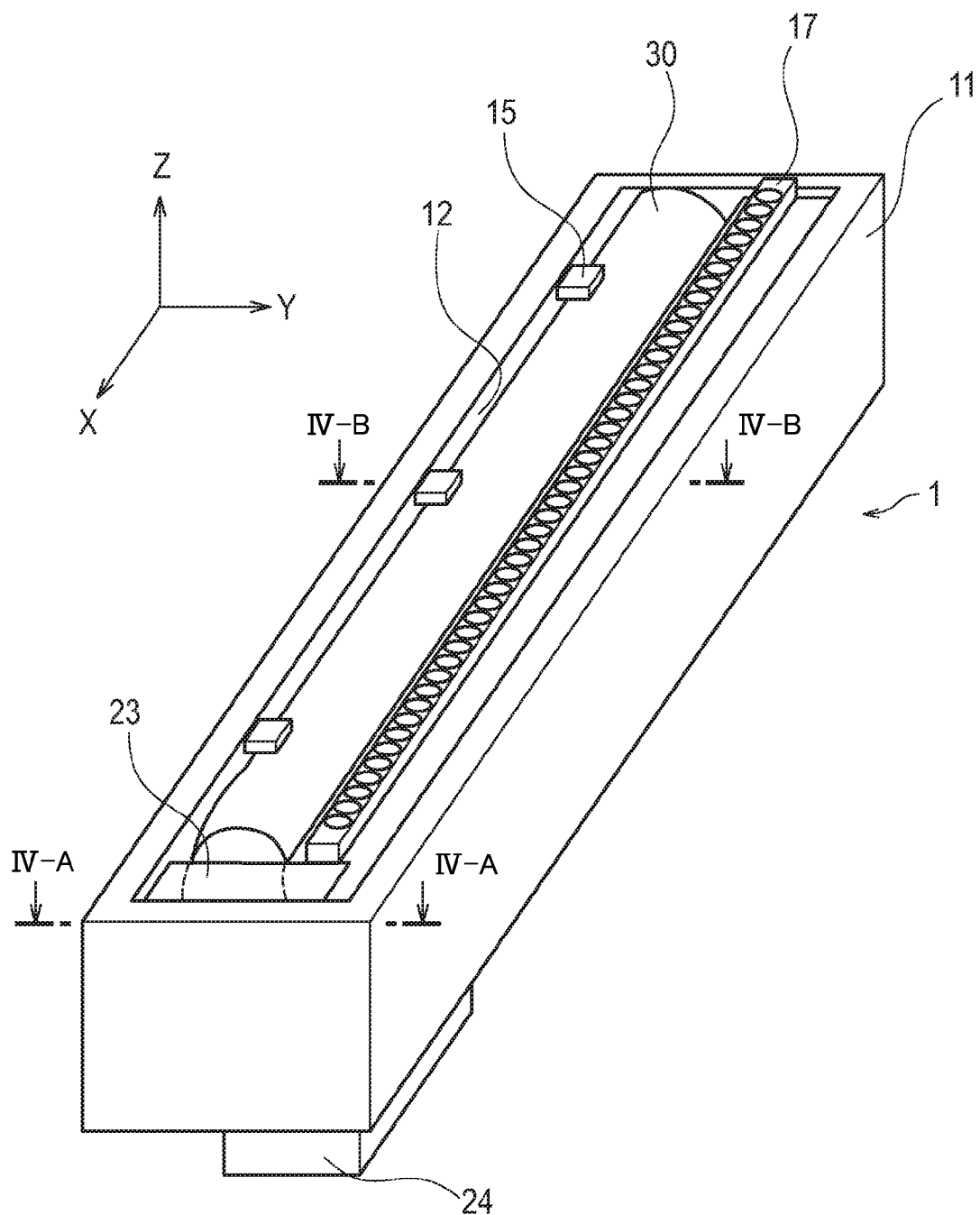
FIG. 2 is an external perspective view illustrating the image sensor unit according to the present embodiment.
Figure 3:
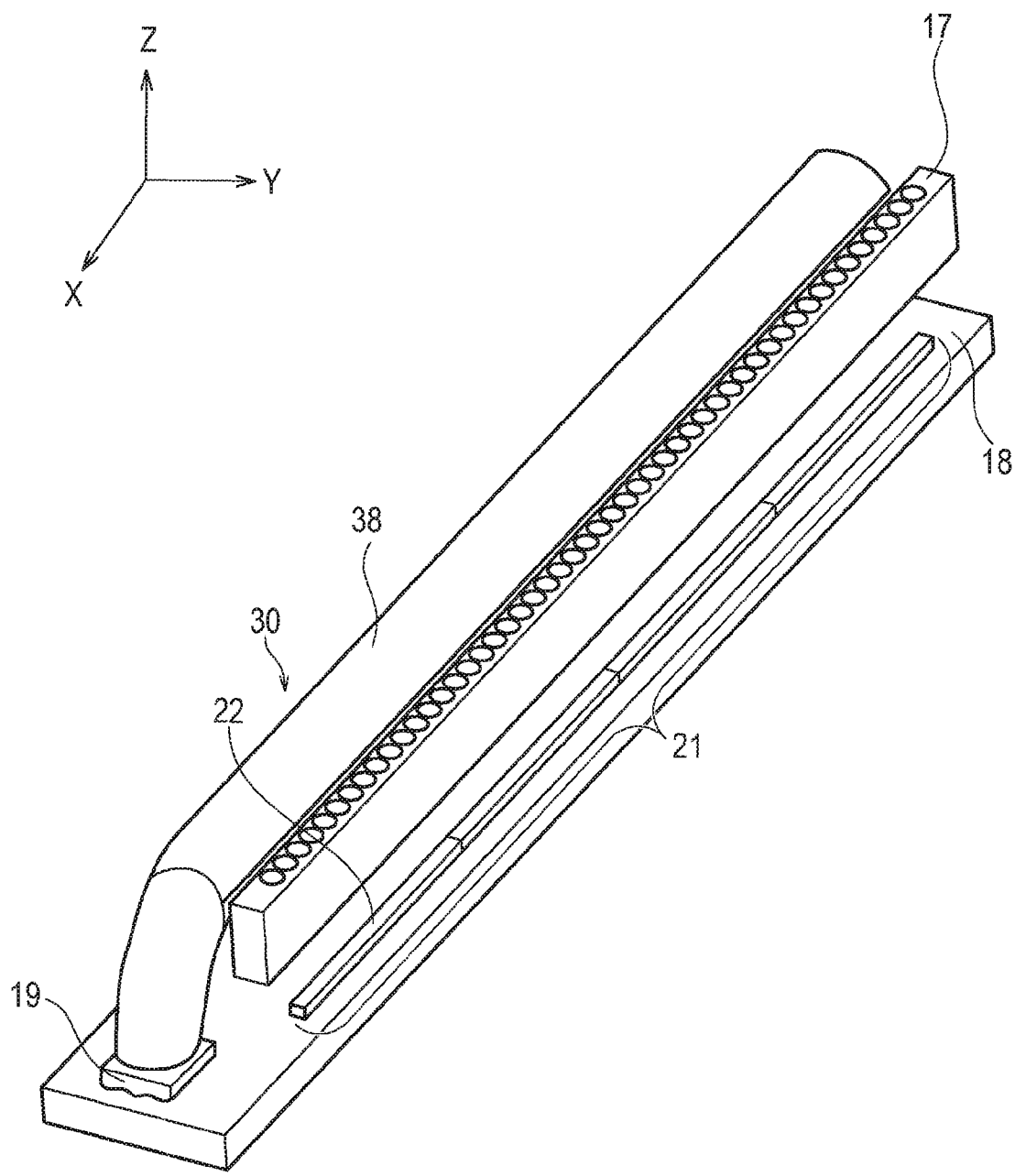
FIG. 3 is a perspective view illustrating a partial configuration of the image sensor unit according to the first embodiment.
Figure 4A:
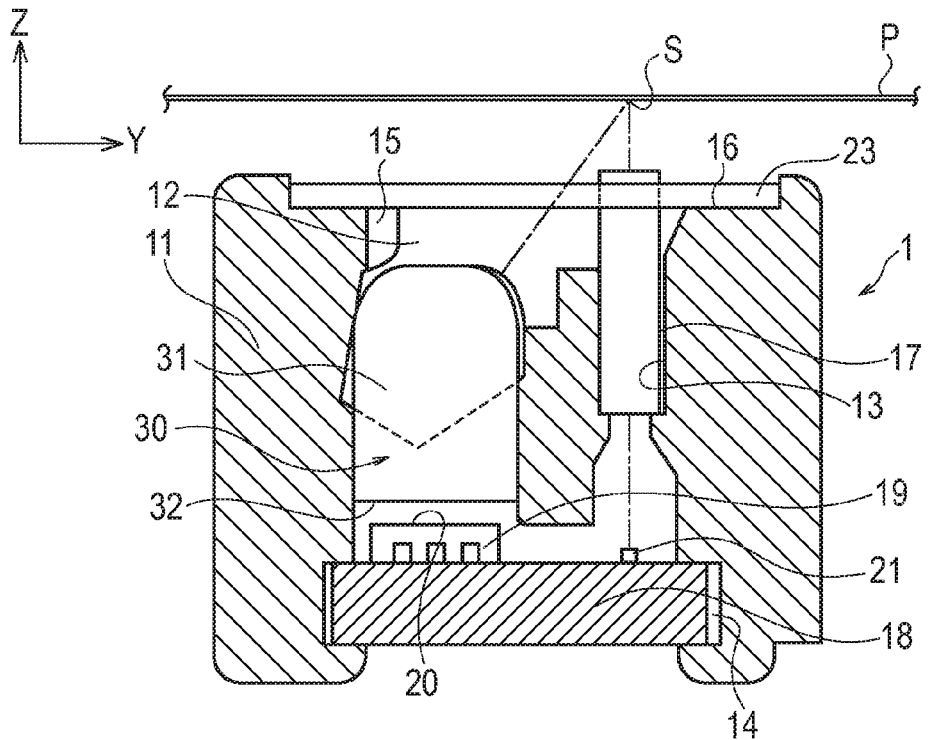
FIG. 4A is a sectional view of a (IV-A)-(IV-A) line of FIG. 2.
Figure 4B:
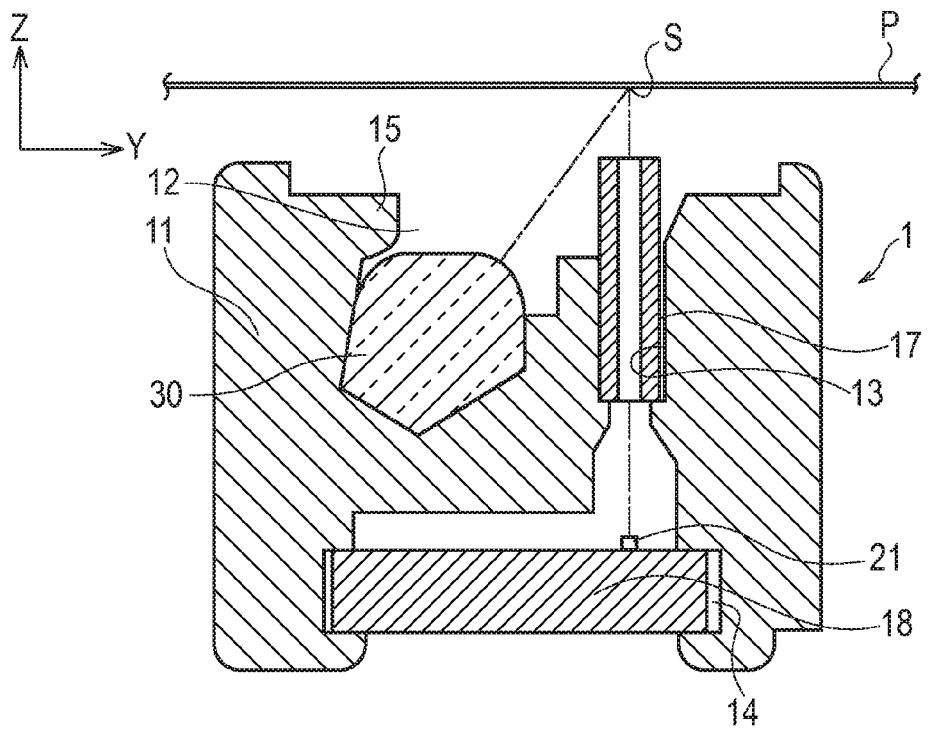
FIG. 4B is a sectional view of a (IV-B)-(IV-B) line of FIG. 2.

An image sensor unit 1 according to the present embodiment will be described with reference to FIGS. 2, 3, 4A, and 4B. FIG. 2 is an external perspective view schematically illustrating a configuration of the image sensor unit 1 according to the present embodiment. FIG. 3 is a perspective view schematically illustrating arrangement of a light condenser, a circuit board, a light source, and an image sensor in the image sensor unit 1 according to the present embodiment. FIG. 4A is a sectional view of a (IV-A)-(IV-A) line illustrated in FIG. 2. FIG. 4B is a sectional view of a (IV-B)-(IV-B) line illustrated in FIG. 2.

An overall configuration of the image sensor unit 1 is as follows. As illustrated in FIG. 2, the image sensor unit 1 is, for example, a contact image sensor (CIS) unit and is a rectangular solid that is long in the main-scan direction. As illustrated in FIGS. 2 and 3, the image sensor unit 1 includes a frame 11, a light guide 30, a light condenser 17, a circuit board 18, a light source 19, an image sensor 21, a light blocking member 23, and a connector 24. The light source 19 includes, for example, light emitting elements 19r, 19g, and 19b with emission wavelengths of three colors red R, green G, and blue B, and the light source 19 and the light guide 30 form an illumination apparatus. The light source 19 and the image sensor 21 are mounted on an upper surface of the circuit board 18.

According to the configuration, the light source 19 successively turns on the light emitting elements 19r, 19g, and 19b to emit light to read the image of the original P. The light guide 30 shapes the light from the light source 19 into a line and emits the light to a reading line S of the original P (see FIGS. 4A and 4B). The light condenser 17 forms an image of the reflection light from the original P on the surface of the image sensor 21. The image sensor 21 converts the reflection light to an electric signal.

The frame 11 is a housing of the image sensor unit 1 and is a member that houses the light guide 30, the light condenser 17, the circuit board 18, and the like. As illustrated in FIG. 2, the frame 11 is a rectangular solid member that is long in the main-scan direction. As illustrated in FIGS. 4A and 4B, a light guide housing chamber 12 as a space that can house the light guide 30 and that opens in an upper direction, a light condenser housing chamber 13 that can house the light condenser 17, and a circuit board housing chamber 14 that can house the circuit board 18 are formed in the frame 11. A light guide holding claw 15 that fixes the light guide 30 housed in the light guide housing chamber 12 is also formed in the frame 11. The light guide holding claw 15 is an elastically deformable projection protruding toward the inside of the light guide housing chamber 12 and is formed integrally with the frame 11. A setting portion 16 that sets the light blocking member 23 is also formed in the frame 11. The frame 11 is formed by a light-blocking resin material that is colored in black, for example. Polycarbonate can be applied as the resin material, for example.

The light condenser 17 is an optical member that forms an image of the reflection light from the original P on the image sensor 21. The light condenser 17 can be a rod-lens array with a plurality of image-forming elements (rod lenses) of an erect equal magnification image-forming type linearly arranged in the main-scan direction. The configuration of the light condenser 17 is not limited to this as long as an image can be formed on the image sensor 21. The light condenser 17 can be an optical member with various well-known light condensing functions, such as various micro-lens arrays.

Figure 5A:
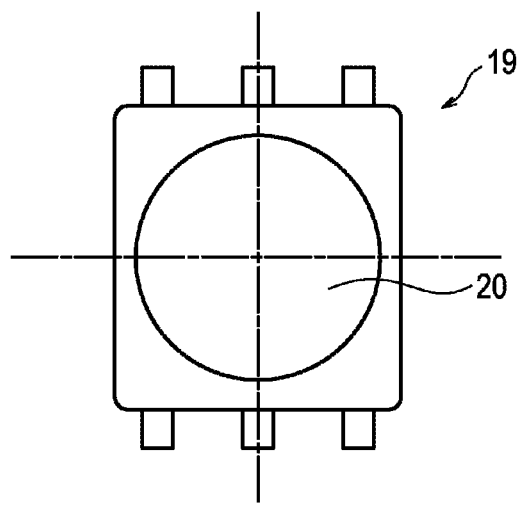
FIG. 5A is a plan view of a light source.
Figure 5B:
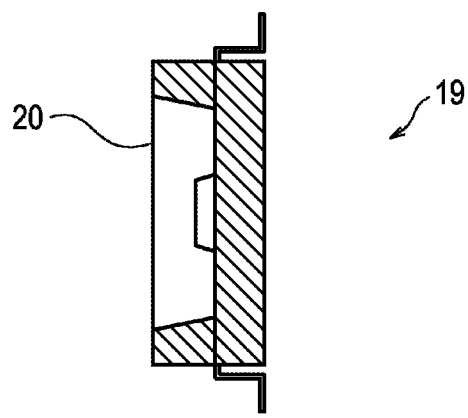
FIG. 5B is a sectional view of the light source.
Figure 5C:
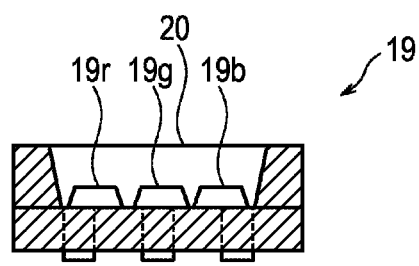
FIG. 5C is a sectional view of the light source.

The light source 19 can be a commercially available surface-mount LED, for example. FIG. 5A is a plan view schematically illustrating a configuration of the light source 19 using an example of the surface-mount LED. FIG. 5B is a sectional view of the light source 19 cut in the main-scan direction. FIG. 5C is a sectional view of the light source 19 cut in the sub-scan direction. As illustrated in FIGS. 5A to 5C, the light source 19 includes a light emitting surface 20 that emits light from the light emitting elements 19r, 19g, and 19b to the outside.

The image sensor 21 can be an image sensor IC array. The image sensor IC array includes a predetermined number of image sensor ICs 22 that are formed by a plurality of light receiving elements (the light receiving elements may also be called photoelectric conversion elements) corresponding to the resolution of reading by the image sensor unit 1 and that are linearly mounted on the circuit board 18. In this way, the image sensor 21 includes a plurality of light receiving elements linearly arranged in the main-scan direction. The image sensor 21 converts the reflection light reflected from the original P and formed into an image by the light condenser 17 to an electric signal. The configuration of the image sensor 21 is not limited to this as long as the reflection light reflected from the original P can be converted to an electric signal. The image sensor IC 22 can be various well-known image sensor ICs.

The circuit board 18 has a quadrilateral shape that is long in the main-scan direction. The light source 19 and the image sensor 21 are mounted on the upper surface of the circuit board 18. The light source 19 is mounted on the surface at one end in the main-scan direction of the circuit board 18, and the light source 19 can emit light in the upper direction of the circuit board 18.

The light blocking member 23 is a plate-like or sheet-like member. For example, the light blocking member 23 can be made of a PET resin colored in black and formed into a plate or sheet shape. The light blocking member 23 is fixed to the setting portion 16 of the frame 11 so as to be positioned in the upper direction of a curved portion 31, described later, of the light guide 30. The light blocking member 23 can block leak light from the curved portion 31 of the light guide 30.

The connector 24 is electrically connected to an image reading apparatus described later or to an image forming apparatus described later. The configuration of the connector 24 is not limited to this as long as the image sensor unit 1 can be connected to the image reading apparatus or the image forming apparatus to allow transmission and reception of power and electric signals.

The light guide 30 is an optical member for shaping the light emitted by the light source 19 into a line and emitting the light to the reading line S of the original P. The light guide 30 is formed by a transparent material, such as glass and a resin material. An acrylic resin material can be applied as the transparent resin material, for example.

Figure 6:
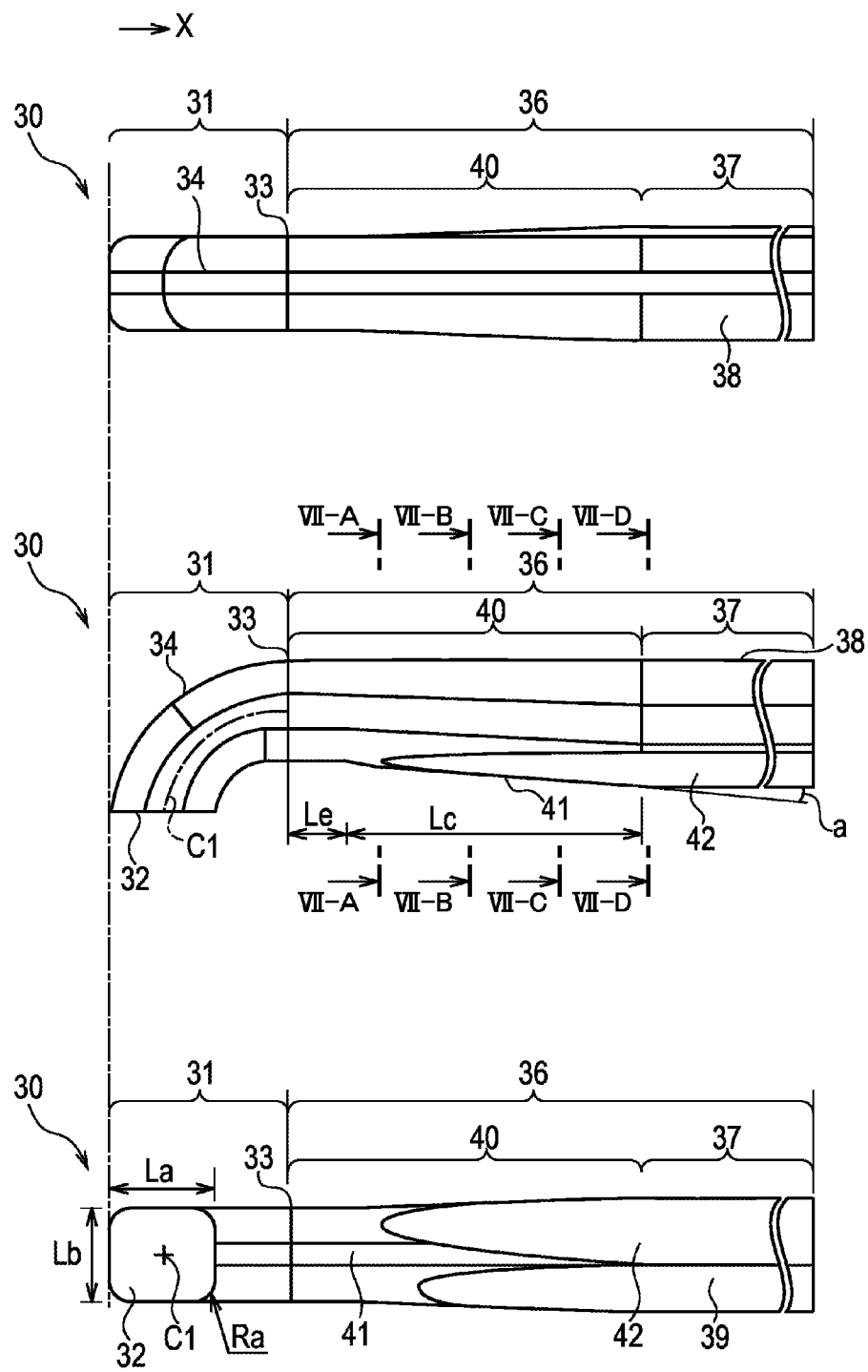
FIG. 6 is a view illustrating configurations of a light guide according to the first embodiment.

FIG. 6 is an external view illustrating configurations of the light guide 30. FIG. 6 illustrates a plan view of the light guide 30 viewed from the upper direction, a front view of the light guide 30 viewed from the sub-scan direction, and a bottom view of the light guide 30 viewed from the lower direction. FIGS. 7A to 7D illustrate sectional views of (VII-A)-(VII-A) to (VII-D)-(VII-D) lines illustrated in FIG. 6, respectively.

The light guide 30 of the present embodiment is configured to be able to reflect light, which has entered from a direction different from the main-scan direction of the light guide 30, in the main-scan direction of the light guide 30 and then emit the light from a light emission surface 38 to thereby illuminate the original P.

A specific shape of the light guide 30 will be described.

The light guide 30 includes the curved portion 31 curved close to one end and a linear portion 36 extending in the main-scan direction toward the other end, and the curved portion 31 and the linear portion 36 are integrated. In the present embodiment, a ratio of the linear dimension of the curved portion 31 in the main-scan direction and the linear dimension of the linear portion 36 in the main-scan direction is 1:40.

The curved portion 31 is a section that guides the light emitted by the light source 19 to the linear portion 36. A light incident surface 32, from which the light emitted by the light source 19 enters, is formed on an end face of the curved portion 31. As illustrated in the bottom view of FIG. 6, the light incident surface 32 has an arc shape (will be called "ellipse" here) formed by trimming the corners of the rectangle. However, the shape of the light incident surface 32 is not limited to this, and the light incident surface 32 can have a circular shape or an elliptical shape. As illustrated in FIG. 4A, the light incident surface 32 is parallel to the light emitting surface 20 of the light source 19 and faces the light emitting surface 20 at a slight interval so that the light emitted by the light source 19 is incident on the light guide 30 at a good yield. The curved portion 31 is curved toward a boundary portion 33 connected to the linear portion 36. Specifically, the curved portion 31 is continuously formed, while the ellipse of the light incident surface 32 is curved at an angle 90° up to the boundary portion 33. Therefore, if the curved portion 31 is cut in the direction orthogonal to a center line C1 illustrated in the front view of FIG. 6, any cross-sectional shape is the same shape as the ellipse of the light incident surface 32.

A peripheral surface of the curved portion 31 is a reflection surface 34 that reflects the light entered from the light incident surface 32 toward the linear portion 36. The reflection surface 34 is curved in the main-scan direction and trimmed into an arc shape in the sub-scan direction. Therefore, the reflection surface 34 has a light collecting effect for efficiently collecting the light in a predetermined range of the linear portion 36.

The linear portion 36 includes a light emitting portion 37 that emits light to the original P and a coupling portion 40 that connects the curved portion 31 with the light emitting portion 37.

The light emission surface 38 is formed on a surface of the light emitting portion 37. The light emission surface 38 is a long and thin surface provided throughout the main-scan direction of the light emitting portion 37 and is a surface that emits linear light throughout the main-scan direction of the original P. The light emission surface 38 is formed, for example, into a convex curved surface in the direction of the reading line S to collect light to the reading line S of the original P illustrated in FIGS. 4A and 4B. A light diffusing surface 39 is formed on the surface facing the light emitting portion 37.

Figure 7A:
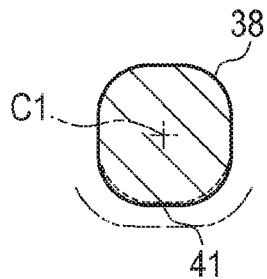
FIG. 7A is a sectional view of a (VII-A)-(VII-A) line of FIG. 6.
Figure 7B:
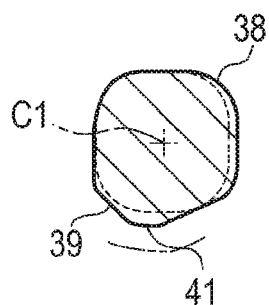
FIG. 7B is a sectional view of a (VII-B)-(VII-B) line of FIG. 6.
Figure 7C:
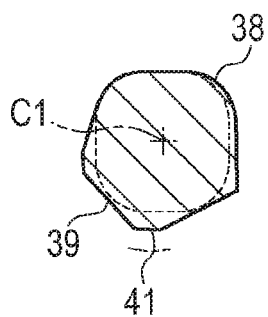
FIG. 7C is a sectional view of a (VII-C)-(VII-C) line of FIG. 6.
Figure 7D:
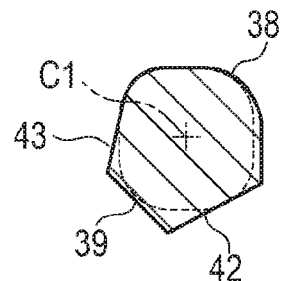
FIG. 7D is a sectional view of a (VII-D)-(VII-D) line of FIG. 6.

The light diffusing surface 39 is a long and thin surface provided throughout the main-scan direction of the light emitting portion 37 and is a surface that reflects and diffuses light incident on the light diffusing surface 39 to the light emission surface 38. The light diffusing surface 39 faces the light emission surface 38, and for example, a light diffusing pattern made of a light reflective paint based on silk screen printing is formed. Since the distribution density of the light diffusing pattern increases with an increase in the distance from the boundary portion 33, uniform light is emitted from the light emission surface 38 throughout the main-scan direction. The cross-sectional shape of the light emitting portion 37 is the same shape, from the (VII-D)-(VII-D) cross section to the other end of the light guide 30. Therefore, the cross-sectional shape illustrated in FIG. 7D is continuously formed up to the other end of the light guide 30. In the light emitting portion 37, surfaces 42, 43, and the like other than the light emission surface 38 and the light diffusing surface 39 function as reflection surfaces for reflecting the incident light.

The coupling portion 40 is a section for smooth transition from the ellipse of the curved portion 31 to the cross-sectional shape of the light emitting portion 37. The coupling portion 40 is formed to allow suppressing the unique light described above. In the coupling portion 40, areas already provided with the light emission surface 38 and the light diffusing surface 39 have similar functions as those of the light emitting portion 37.

The top of the coupling portion 40 continuously couples the top of the boundary portion 33 and the light emission surface 38 of the light emitting portion 37 in the main-scan direction. Meanwhile, the bottom of the coupling portion 40 is provided with an inclined portion 41 including a section inclined at an inclination angle a in the lower direction relative to the main-scan direction from the lower end near the boundary portion 33 when viewed in the front view of FIG. 6. More specifically, the inclined portion 41 includes a section inclined from a position close to the boundary portion 33 toward the opposite side of the side from which the light emitting portion 37 emits light (lower direction illustrated in the front view of FIG. 6). The inclined portion 41 is formed in a range where the light entered from the light incident surface 32 of the curved portion 31 and reflected by the reflection surface 34 enters.

The shape of the inclined portion 41 will be described with reference to FIGS. 7A to 7D. FIGS. 7A to 7D illustrate the cross-sectional shape of the boundary portion 33 by a dashed line and illustrate the center line of the boundary portion 33 by C1 to allow understanding the transition in the cross-sectional shape. FIGS. 7A to 7C illustrate a range of the position of the inclined portion 41 by an alternate long and two short dashes line. As illustrated in FIGS. 7A to 7C, the inclined portion 41 is formed in an arc shape. With the transition from FIG. 7A to FIG. 7C, the inclined portion 41 is gradually separated from the center line C1, and the range of the inclined portion 41 is reduced. Ultimately, the inclined portion 41 disappears, and there is a transition to the light diffusing surface 39 or to the surface 42 as illustrated in FIG. 7D.

Figure 1:
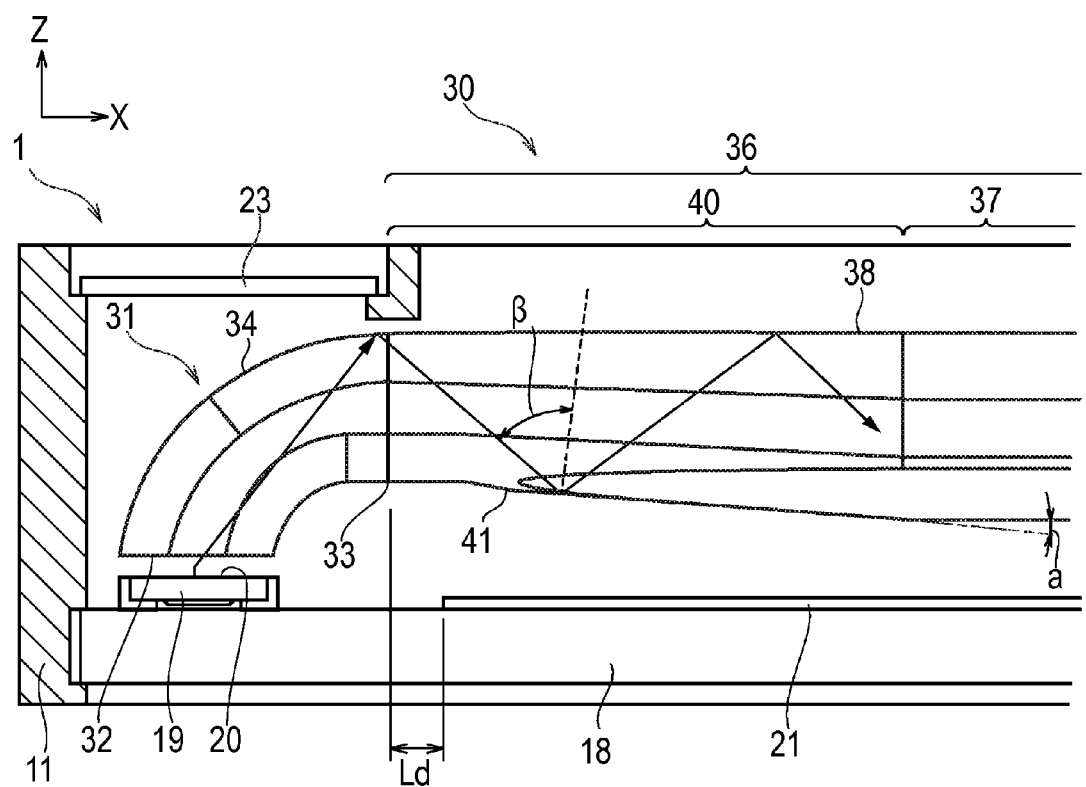
FIG. 1 is a sectional view of an image sensor unit viewed from a sub-scan direction according to a first embodiment.

An effect of the inclined portion 41 will be described with reference to FIG. 1. FIG. 1 is a sectional view of the image sensor unit 1 viewed from the sub-scan direction according to the present embodiment. The light condenser 17 is not illustrated here.

Figure 8:
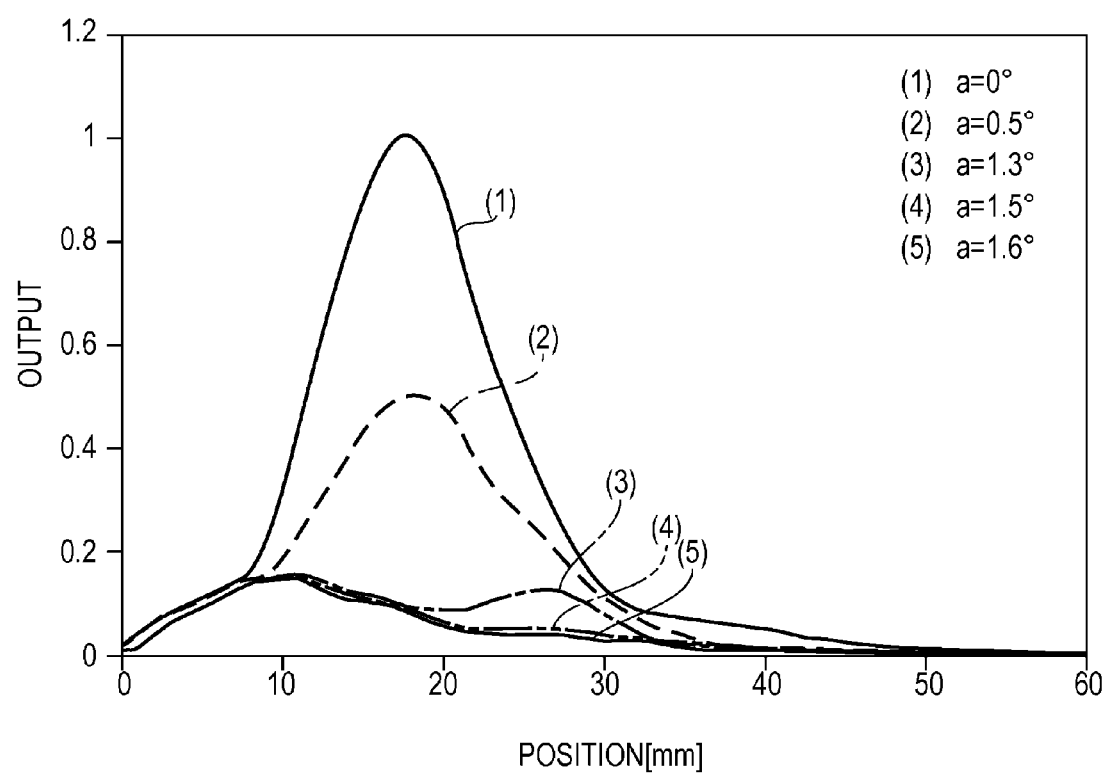
FIG. 8 is a graph illustrating changes in output values of the image sensor when an inclination angle of the light guide is changed.

As illustrated in FIG. 1, the light entered from the light source 19 to the curved portion 31 of the light guide 30 is completely reflected by the reflection surface 34 of the curved portion 31 and is propagated to the linear portion 36. The light propagated from the curved portion 31 to the linear portion 36 enters the inclined portion 41. Since the inclined portion 41 is inclined at the inclination angle a in the lower direction relative to the main-scan direction, an incident angle β of the light incident on the inclined portion 41 can be increased. More specifically, incident angle α<incident angle β can be attained, compared to an incident angle α of FIG. 17 without the formation of the inclined portion 41. The light changed by the inclined portion 41 to have a large incident angle is reflected by the inclined portion 41, and then the light with the large incident angle can enter the light emission surface 38. Therefore, as illustrated in FIG. 8 described later, most of the light reflected by the inclined portion 41 can be propagated in the main-scan direction of the light guide 30 without being emitted from the light emission surface 38. The light propagated in the main-scan direction of the light guide 30 is diffused based on the light diffusing pattern of the light diffusing surface 39 and is emitted from the light emission surface 38 to the original P. In this way, since the inclined portion 41 can increase the incident angle β of the light incident on the inclined portion 41, the light reflected by the inclined portion 41 and not directly emitted from the light emission surface 38 is propagated in the longitudinal direction of the light guide. Therefore, the generation of unique light can be reduced, and the illuminance of the light emitted from the light guide 30 can be uniform throughout the main-scan direction.

The inclination angle α of the inclined portion 41 will be verified.

The incident angle β of the light incident on the inclined portion 41 varies according to the inclination angle a the inclined portion 41. More specifically, the incident angle β of the light incident on the inclined portion 41 is large if the inclination angle a of the inclined portion 41 is large, and the incident angle β of the light incident on the inclined portion 41 is small if the inclination angle a of the inclined portion 41 is small. An optimal inclination angle a will be verified here.

The verified shape of the light guide is as follows in the light guide 30 illustrated in FIG. 6. The light incident surface 32 is shaped at La=3.5 mm, Lb=3.0 mm, and Ra=1.1 mm. The curved portion has an average radius of curvature Rb=6.2 mm. The inclined portion 41 has a length Lc=10.0 mm in the main-scan direction. A length Le from the boundary portion 33 to the inclination start position of the inclined portion 41 is 1.9 mm. A length Ld from the boundary portion 33 to the image sensor 21 illustrated in FIG. 1 is 1.4 mm. The inclination angle a of the inclined portion 41 is changed to (1) a=0°, (2) a=0.5°, (3) a=1.3°, (4) a=1.5°, and (5) a=1.6° in the simulation. The light blocking member 23 is provided in the simulation to eliminate the influence of the leak light.

FIG. 8 is a graph comparing the brightness of the original P when the inclination angle a of the inclined portion 41 is changed. The horizontal axis indicates the position of the image sensor 21 in the main-scan direction. The position of "0 mm" on the horizontal axis is close to the light source 19. The vertical axis indicates output of the image sensor 21. More specifically, the image sensor 21 reads the reflection light when the light emitted from the light guide 30 illuminates the original P, and the value is output. The output value indicates a value standardized by a maximum output value of the image sensor 21 at inclination angle a=0°.

Figure 18:
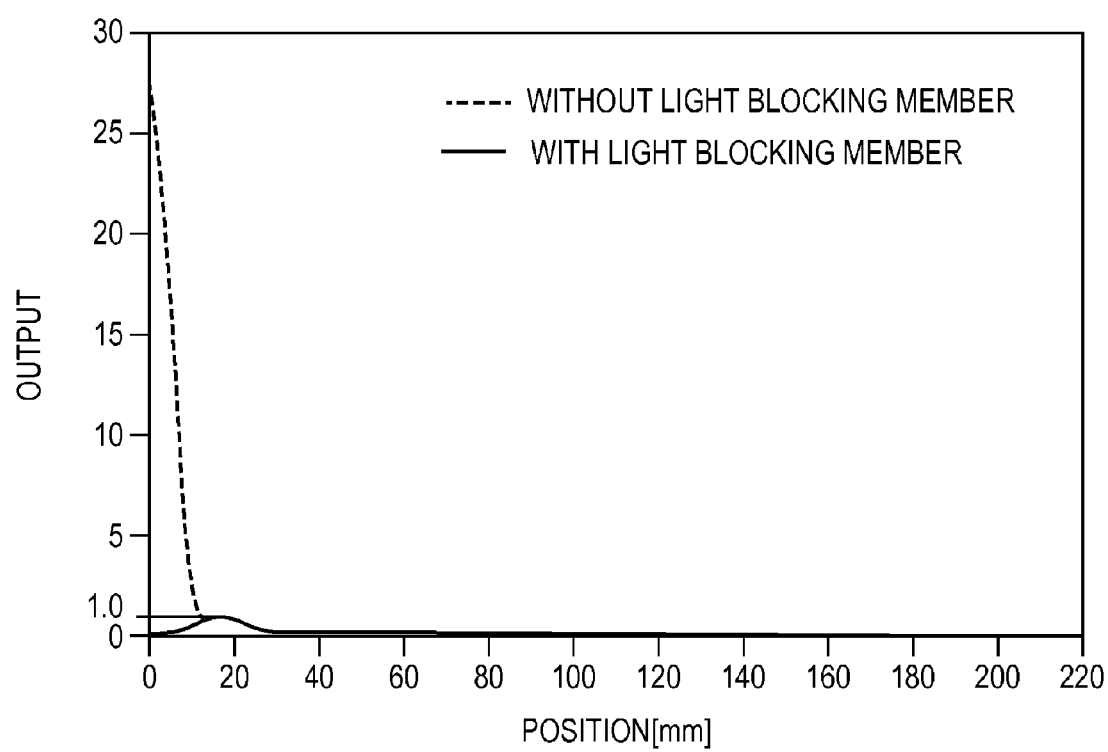
FIG. 18 is a graph illustrating changes in output values of an image sensor when a light blocking member is provided.

A characteristic line of the image sensor 21 at inclination angle a=0° coincides with a characteristic line of an image sensor 81 when a light blocking member 82 is provided in FIG. 18. More specifically, at inclination angle a=0°, unique light emitted from the light emission surface 38 of the light guide 30 is detected at a specific position in the main-scan direction.

On the other hand, the unique light decreases with an increase in the inclination angle a, and the unique light is not detected at inclination angle a=1.6°. In this way, setting the inclination angle a of the inclined portion 41 equal to or greater than a predetermined angle can reduce the generation of the unique light, and uniform light can be emitted throughout the main-scan direction of the light guide 30. The use of the light guide 30 including the inclined portion 41 formed at the critical inclination angle a (a=1.6° here) can uniformly emit the light throughout the main-scan direction without significantly changing the image sensor unit 1.

Figure 17:
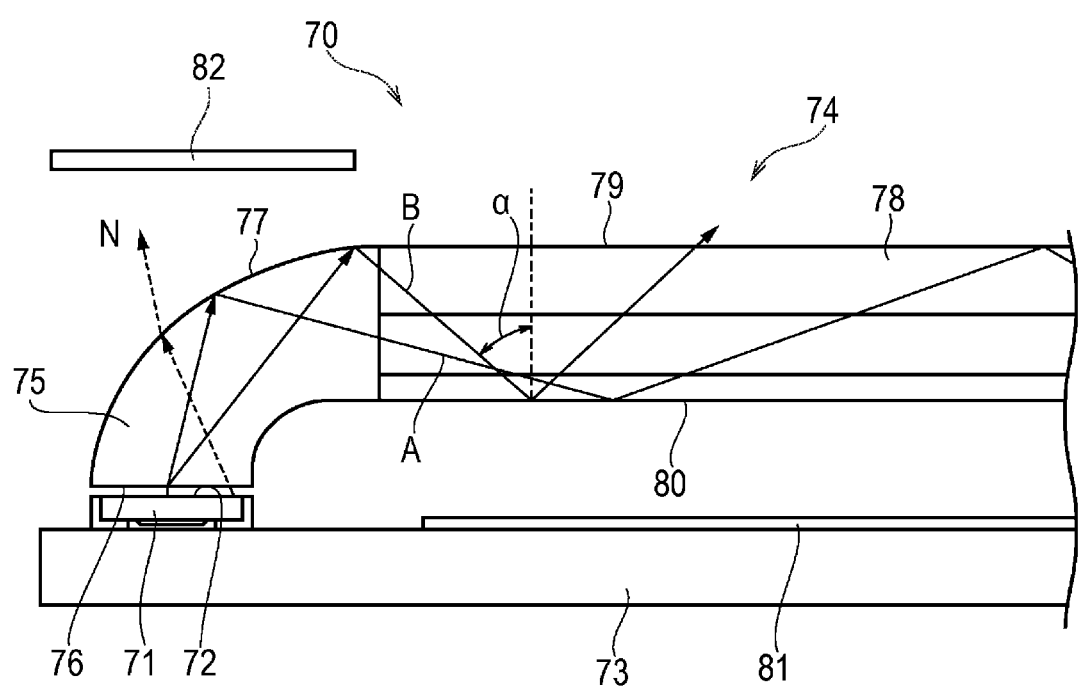
FIG. 17 is a sectional view of an image sensor unit viewed from the sub-scan direction according to a comparative example.

A factor of the occurrence of the leak light will be described with reference to FIG. 17. FIG. 17 is a sectional view of an image sensor unit 70 viewed from the sub-scan direction according to a comparative example, the image sensor unit 70 including a light guide that can propagate light, which has entered from a direction different from the longitudinal direction of the light guide, in the longitudinal direction of the light guide.

The image sensor unit 70 includes a light source 71, a circuit board 73, a light guide 74, and the image sensor 81. A rod-lens array is not illustrated here.

The light source 71 is, for example, a surface-mount LED and includes a light emitting surface 72 that emits light from a light emitting element to the outside. The light source 71, mounted on the upper surface of the circuit board 73, emits light upward from the light emitting surface 72.

The light guide 74 includes a curved portion 75 and a linear portion 78. The curved portion 75 is a section that guides the light emitted by the light source 71 to the linear portion 78. An end face of the curved portion 75 is an incident surface 76 from which the light emitted by the light source 71 enters. A curved reflection surface 77 that reflects the light entered from the incident surface 76 toward the linear portion 78 is formed on the curved portion 75. The linear portion 78 has a rod shape extending in the main-scan direction. A light emission surface 79 that emits linearized light to the original P positioned in the upper direction of the linear portion 78 throughout the main-scan direction is formed on the upper side of the linear portion 78. A reflection surface 80 that reflects the light guided by the curved portion 75 toward the light emission surface 79 is formed on the lower side of the linear portion 78.

The image sensor 81, mounted on the upper surface of the circuit board 73, converts reflection light of the original P generated based on the emission by the light guide 74 to an electric signal.

A factor that the light cannot be uniformly emitted in the longitudinal direction of the light guide 74 in the image sensor unit 70 with the configuration described above will be described. As illustrated in FIG. 17, light incident on the light guide 74 from the center of the light source 71 (solid arrow illustrated in FIG. 17) is completely reflected by the reflection surface 77 of the curved portion 75 and is guided to the linear portion 78. Meanwhile, light incident on the light guide 74 from around the light source 71 (dashed arrow illustrated in FIG. 17) reaches the reflection surface 77 of the curved portion 75. However, the light is not completely reflected because the incident angle relative to the reflection surface 77 is small, and part of the light becomes leak light N and is leaked outside of the light guide 74. The leak light N reaches the original P, and the light is unevenly emitted in the longitudinal direction of the light guide 74.

To solve the problem, the light blocking member 82 that covers the curved portion 75 of the light guide 74 from the upper direction can be provided as illustrated in FIG. 17. The light blocking member 82 blocks the leak light N from the curved portion 75 to prevent the light from leaking in the upper direction.

FIG. 18 is a graph comparing the brightness of the original P when the light blocking member 82 is provided and the brightness of the original P when the light blocking member is not provided. The horizontal axis denotes the position of the image sensor 81 in the main-scan direction. The position of "0 mm" on the horizontal axis is close to the light source 71. The vertical axis denotes output of the image sensor 81. More specifically, the image sensor 81 reads the reflection light when the light emitted by the light guide 74 illuminates the original P, and the value is output. The output value indicates a value standardized by a maximum output value of the image sensor 81 when the light blocking member 82 is provided.

As illustrated in FIG. 18, the output value near the light source 71 is the largest when the light blocking member is not provided, and the output value decreases with an increase in the distance from the light source 71. It can be considered that the output value is increased by the leak light N. On the other hand, the maximum value of the output value is significantly reduced when the light blocking member 82 is provided. In this way, the arrangement of the light blocking member 82 can block the leak light N before the light reaches the original P.

However, as illustrated in FIG. 18, a large output value is detected near a predetermined position (20 mm) on the horizontal axis even if the light blocking member 82 is provided, and it is proved that uneven emission in the longitudinal direction of the light guide 74 cannot be solved. Therefore, the path of the light incident on the light guide 74 is analyzed in the image sensor unit 70 based on a simulation from the entry of the light to the light guide 74 to the emission of the light from the light guide 74.

As a result, it can be confirmed that unique light is emitted from the light guide 74 at the predetermined position in the main-scan direction. Specifically, the light propagated from the curved portion 75 to the linear portion 78 is completely reflected by the reflection surface 80 of the linear portion 78 and is propagated in the longitudinal direction of the linear portion 78. In this case, light with a large incident angle (solid line A illustrated in FIG. 17) in the light incident on the reflection surface 80 from the curved portion 75 is completely reflected by the reflection surface 80, and the light enters the light emission surface 79 of the linear portion 78 at the large incident angle. Therefore, the light is completely reflected by the light emission surface 79 and is further propagated in the longitudinal direction of the light guide 74. On the other hand, light with a small incident angle (solid arrow B illustrated in FIG. 17) in the light incident on the reflection surface 80 from the curved portion 75 is completely reflected by the reflection surface 80, and the light enters the light emission surface 79 of the linear portion 78 at the small incident angle. Therefore, the light is emitted from the light emission surface 79 without being completely reflected by the light emission surface 79, and the light is emitted to the outside. In this way, the emitted light becomes unique light, and the unique light is output at the predetermined position in the main-scan direction as illustrated in FIG. 18. This makes the uniform emission in the longitudinal direction of the light guide 74 difficult. Since the directivity of the unique light is high, local luminance unevenness (density unevenness) occurs in reading a partially floating original P, such as an open book, and this may degrade the image quality.

In the first embodiment, the inclined portion 41 inclined in the direction for increasing the incident angle of the light is formed in the range in the linear portion 36 of the light guide 30 where the light reflected by the reflection surface 34 of the curved portion 31 enters. As a result, the light reflected by the inclined portion 41 can be completely reflected without being emitted from the light emission surface 38 of the light emitting portion 37. Therefore, the light reflected by the inclined portion 41 can be propagated in the main-scan direction of the light guide 30. The generation of the unique light can be reduced, and the illuminance of the light emitted from the light guide 30 can be uniform throughout the main-scan direction. The reduction in the generation of the unique light with directivity can reduce the generation of the local luminance unevenness (density unevenness) even if a partially floating original P is read.

Second Embodiment

An image sensor unit 2 according to a second embodiment will be described. Although an external perspective view of the image sensor unit 2 according to the second embodiment is similar to the external perspective view illustrated in FIG. 2, the shape of the light guide is different from that of the first embodiment. The configurations common to those of the first embodiment are designated with the same reference numerals, and the description will not be repeated.

Figure 9:
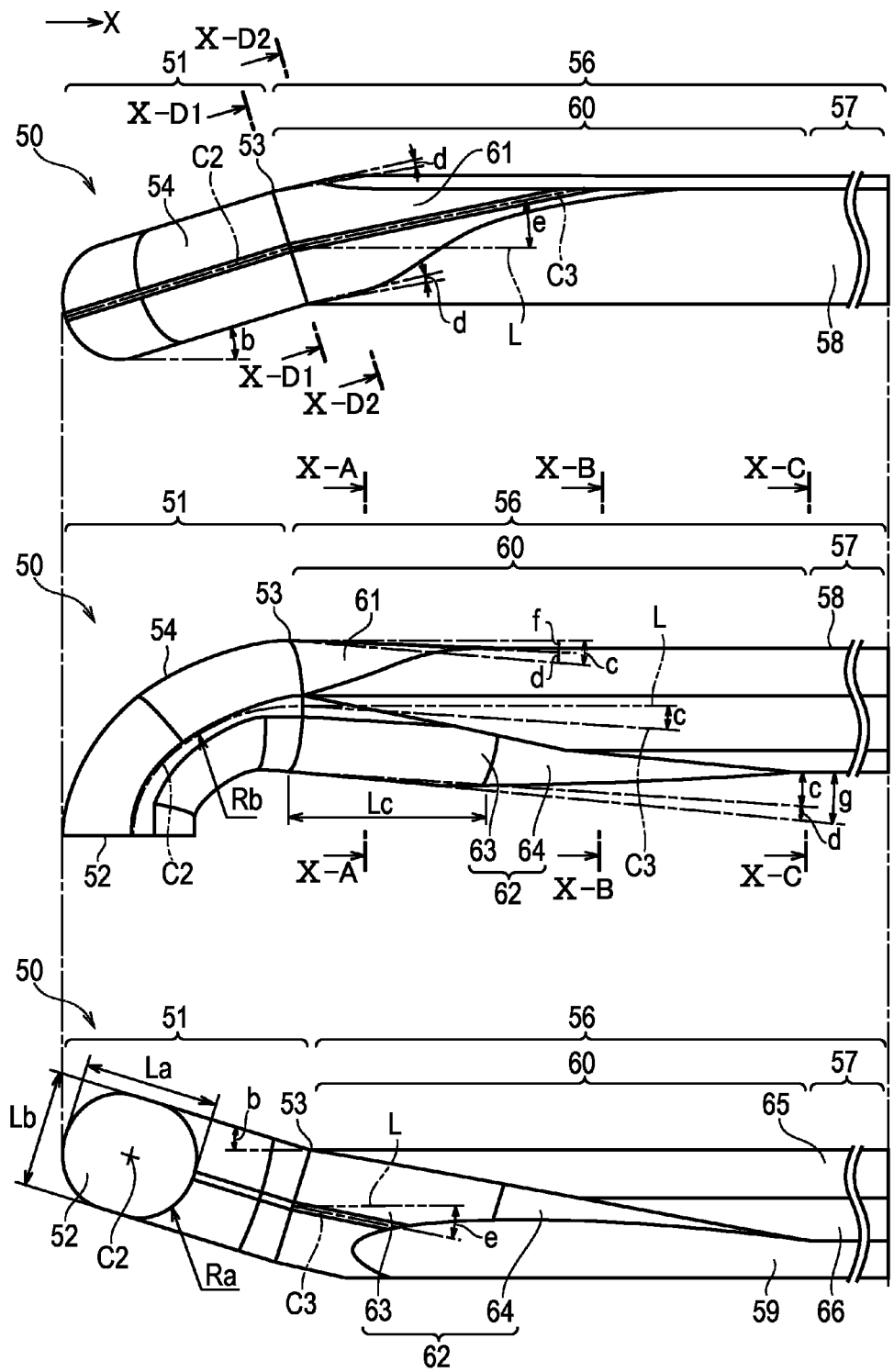
FIG. 9 is a view illustrating a configuration of a light guide according to a second embodiment.
Figure 10A:
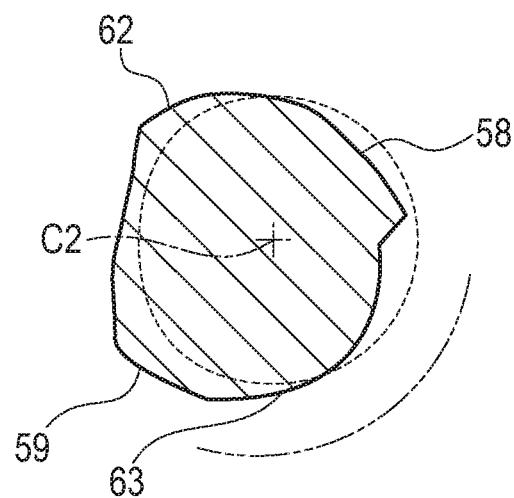
FIG. 10A is a sectional view of a (X-A)-(X-A) line of FIG. 9.
Figure 10B:
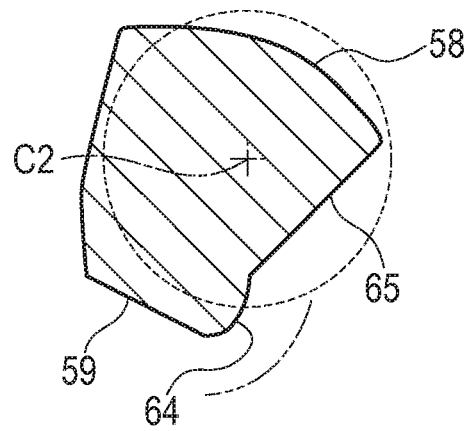
FIG. 10B is a sectional view of a (X-B)-(X-B) line of FIG. 9.
Figure 10C:
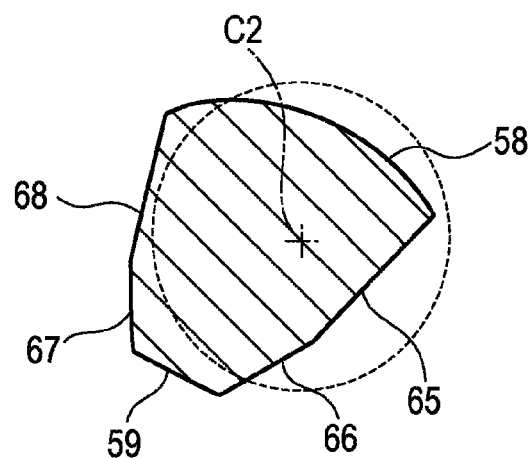
FIG. 10C is a sectional view of a (X-C)-(X-C) line of FIG. 9.
Figure 10D:
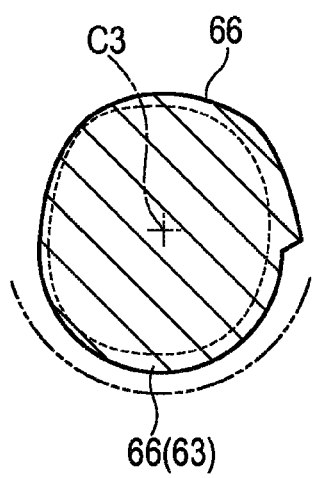
FIG. 10D is a sectional view of a (X-D1)-(X-D1) line and a sectional view of a (X-D2)-(X-D2) line of FIG. 9.

FIG. 9 is an external view illustrating a configuration of a light guide 50 according to the present embodiment. FIG. 9 illustrates a plan view of the light guide 50 viewed from the upper direction, a front view of the light guide 50 viewed from the sub-scan direction, and a bottom view of the light guide 50 viewed from the lower direction. FIGS. 10A to 10C illustrate sectional views of (X-A)-(X-A) to (X-C)-(X-C) lines illustrated in FIG. 9, and FIG. 10D illustrates a sectional view of (X-D1)-(X-D1) and (X-D2)-(X-D2) lines cut in a direction orthogonal to an axis line C3 illustrated in FIG. 9.

The light guide 50 of the present embodiment is configured to be able to reflect light, which has entered from a direction different from the main-scan direction of the light guide 50, in the main-scan direction of the light guide 50 and then emit the light from a light emission surface 58 to thereby illuminate the original P.

A specific shape of the light guide 50 will be described.

The light guide 50 includes a curved portion 51 curved close to one end and a linear portion 56 extending in the main-scan direction toward the other end, and the curved portion 51 and the linear portion 56 are integrated. In the present embodiment, a ratio of the linear dimension of the curved portion 51 in the main-scan direction and the linear dimension of the linear portion 56 in the main-scan direction is 1:40.

The curved portion 51 is a section that guides the light emitted by the light source 19 to the linear portion 56. A light incident surface 52 for the light emitted by the light source 19 to enter is formed on an end face of the curved portion 51. As illustrated in the bottom view of FIG. 9, the light incident surface 52 has an elliptical shape. The curved portion 51 is curved toward a boundary portion 53 connected to the linear portion 56. Specifically, the curved portion 51 is continuously formed, while the ellipse of the light incident surface 52 is curved at an angle 90° up to the boundary portion 53. Therefore, if the curved portion 51 is cut in the direction orthogonal to a center line C2 illustrated in FIG. 9, any cross-sectional shape is the same shape as the ellipse of the light incident surface 52.

As illustrated in the plan view and the bottom view of FIG. 9, the curved portion 51 is bent at an angle b relative to the main-scan direction. In this way, the curved portion 51 has a twisted shape that is bent relative to the main-scan direction when viewed from the vertical direction and that is curved when viewed from the sub-scan direction. A peripheral surface of the curved portion 51 is a reflection surface 54 that reflects the light entered from the light incident surface 52 toward the linear portion 56. The reflection surface 54 is curved in the main-scan direction and trimmed into an arc shape in the sub-scan direction. Therefore, the reflection surface 54 has a light collecting effect for efficiently collecting the light in a predetermined range of the linear portion 56.

The linear portion 56 includes a light emitting portion 57 that emits light to the original P and a coupling portion 60 that connects the curved portion 51 with the light emitting portion 57.

The light emission surface 58 is formed on a surface of the light emitting portion 57. The light emission surface 58 is a long and thin surface provided throughout the main-scan direction of the light emitting portion 57 and is a surface that emits linear light throughout the main-scan direction of the original P. A light diffusing surface 59 is formed on the surface facing the light emitting portion 57.

The light diffusing surface 59 is a surface that reflects and diffuses the light incident on the light diffusing surface 59 to the light emission surface 58. The configurations and the functions of the light emission surface 58 and the light diffusing surface 59 are similar to those of the first embodiment. The cross-sectional shape of the light emitting portion 57 is the same shape, from the (X-D1)-(X-D1) cross section to the other end of the light guide 50. Therefore, the cross-sectional shape illustrated in FIG. 10C is continuously formed up to the other end of the light guide 50. In the light emitting portion 57, surfaces 65 to 68 other than the light emission surface 58 and the light diffusing surface 59 function as reflection surfaces for reflecting the incident light.

The coupling portion 60 is a section for smooth transition from the ellipse of the curved portion 51 to the cross-sectional shape of the light emitting portion 57. The coupling portion 60 is formed to be able to suppress the unique light described above. In the coupling portion 60, areas already provided with the light emission surface 58 and the light diffusing surface 59 have similar functions as those of the light emitting portion 57.

An upper coupling portion 61 for mainly coupling the top of the boundary portion 53 and the light emission surface 58 of the light emitting portion 57 is formed on the top of the coupling portion 60 close to the boundary portion 53. A lower coupling portion 62 for coupling the bottom of the boundary portion 53 with the light diffusing surface 59 and the like is formed on the bottom of the coupling portion 60.

The axis line C3 of an axis portion with a combination of the upper coupling portion 61 and the lower coupling portion 62 is inclined at an angle c in the lower direction relative to an axis line L in the main-scan direction as illustrated in the front view of FIG. 9. More specifically, the axis line C3 of the axis portion is inclined toward the opposite side of the side from which the light emitting portion 57 emits the light. The upper coupling portion 61 and the lower coupling portion 62 spread in a conical shape around the axis line C3 at an angle d so as to increase the sectional area of the coupling portion 60 toward the other end of the light guide 50. The angle c is greater than the angle d here. As illustrated in the plan view and the bottom view of FIG. 9, the axis line C3 of the axis portion with the combination of the upper coupling portion 61 and the lower coupling portion 62 is inclined at an angle e in the sub-scan direction relative to the axis line L in the main-scan direction. The angle b is greater than the angle e here. The angle d spread into the conical shape is indicated not only in the front view of FIG. 9, but also in the plan view of FIG. 9. In this way, although part of the coupling portion 60 is along the main-scan direction, the coupling portion 60 has a section inclined at the angle e in the sub-scan direction and at the inclination angle c in the lower direction.

FIG. 10D is a sectional view cut in the direction orthogonal to the axis line C3. The sectional view of the (X-D1)-(X-D1) line is indicated by a dashed line, and the sectional view of the (X-D2)-(X-D2) line is indicated by a solid line. As illustrated in FIG. 10D, it can be confirmed that the upper coupling portion 61 and the lower coupling portion 62 lead to further spread into the conical shape compared to the cross-sectional shape of the boundary portion 53.

Although the upper coupling portion 61 is inclined at the angle c from the upper end of the boundary portion 53 toward the lower direction relative to the main-scan direction in the front view of FIG. 9, the upper coupling portion 61 spreads at the angle d. Therefore, the upper coupling portion 61 is actually inclined in the lower direction at angle c−angle d=inclination angle f and is then connected to the light emission surface 58. Thus, the upper surface of the light emission surface 58 is arranged at a position lower than the upper end of the boundary portion 53. FIGS. 10A to 10C illustrate the cross-sectional shape of the boundary portion 53 by a dashed line and illustrate the center line of the boundary portion 33 by C2 to allow understanding the transition in the cross-sectional shape. In FIGS. 10A to 10C, it can be confirmed that the upper end of the light emission surface 58 is at a position lower than the upper end of the boundary portion 53.

Meanwhile, the lower coupling portion 62 is inclined at the inclination angle c from the lower end of the boundary portion 53 toward the lower direction relative to the main-scan direction in the front view of FIG. 9, and the lower coupling portion 62 further spreads at the predetermined angle d. Therefore, the lower coupling portion 62 actually has a section inclined in the lower direction at angle c+angle d=inclination angle g. The lower coupling portion 62 is inclined in the lower direction and is then conversely inclined in the upper direction to be coupled to the light emitting portion 57. An inclined portion including the section inclined at the inclination angle g will be called a first inclined portion 63, and an inclined portion including the section inclined in the upper direction will be called a second inclined portion 64. More specifically, the first inclined portion 63 has a section inclined from the boundary portion 53 toward the opposite side (lower direction illustrated in the front view of FIG. 9) of the side where the light emitting portion 57 emits the light. The first inclined portion 63 is formed in a range where the light entered from the light incident surface 52 of the curved portion 51 and reflected by the reflection surface 54 enters.

The shape of the first inclined portion 63 will be described with reference to FIGS. 10A and 10D. FIGS. 10A and 10D illustrate the range of the position of the first inclined portion 63 by an alternate long and two short dashes line. As illustrated in FIGS. 10A and 10D, the first inclined portion 63 has an arc shape. The range of the first inclined portion 63 gradually decreases toward the other end of the light guide 50, such as from FIG. 10D to FIG. 10A. More specifically, the first inclined portion 63 gradually becomes smaller toward the other end of the light guide 50 as illustrated in the bottom view of FIG. 9, and there is a transition to the light diffusing surface 59 and the second inclined portion 64.

The shape of the second inclined portion 64 will be described with reference to FIG. 10B. FIG. 10B illustrates the range of the position of the second inclined portion 64 by an alternate long and two short dashes line. As illustrated in FIG. 10B, the second inclined portion 64 has an arc shape. The range of the second inclined portion 64 gradually decreases toward the other end of the light guide 50. More specifically, the second inclined portion 64 gradually becomes small toward the other end of the light guide 50 as illustrated in the bottom view of FIG. 9, and there is a transition to the light diffusing surface 59.

Figure 11:
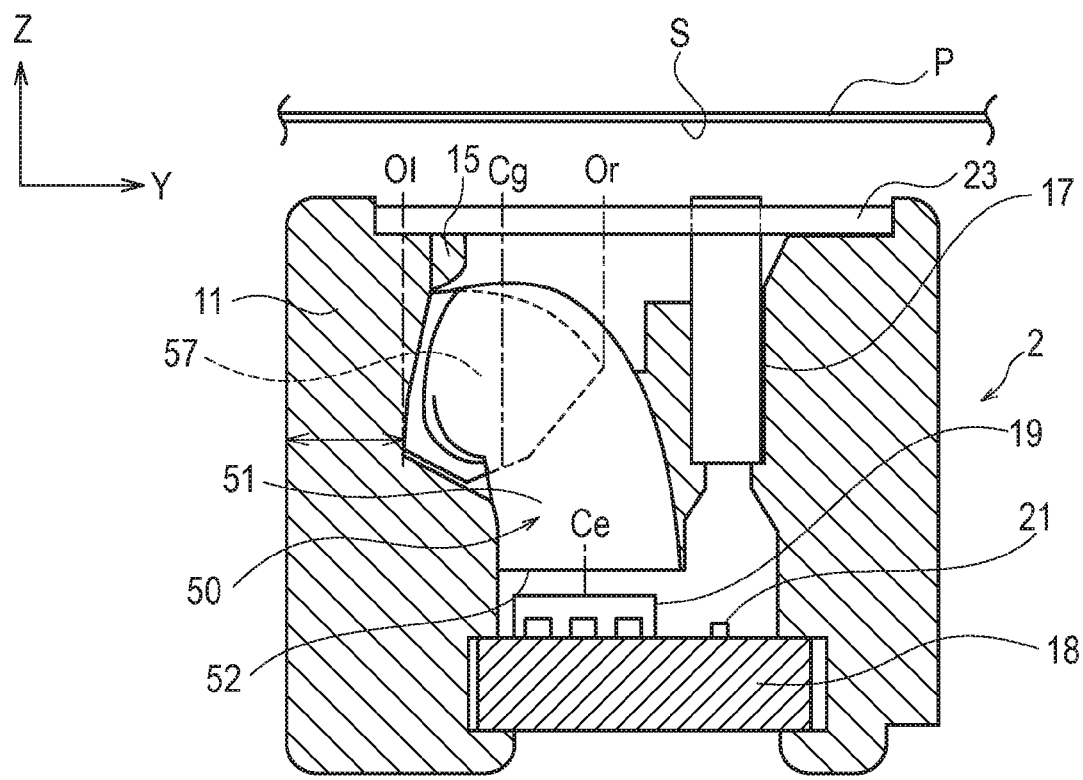
FIG. 11 is a sectional view of an image sensor unit viewed from a main-scan direction according to a second embodiment.

The image sensor unit 2 provided with the light guide 50 according to the present embodiment will be described with reference to FIG. 11. FIG. 11 is a sectional view cutting the image sensor unit 2 at a position similar to the (IV-A)-(IV-A) line illustrated in FIG. 2.

The curved portion 51 of the light guide 50 according to the present embodiment has a twisted shape that is bent relative to the main-scan direction when viewed from the vertical direction and that is curved when viewed from the sub-scan direction. A center position Ce of the light incident surface 52 of the light guide 50 is displaced from a center position Cg of the light emitting portion 57. Therefore, the center position Ce of the light incident surface 52 of the light guide 50 can be arranged closer to the image sensor 21, compared to the center position Cg of the light emitting portion 57. The light source 19 can be mounted closer to the image sensor 21 in the sub-scan direction, compared to the image sensor unit 1 (see FIG. 4A) including the light guide 30 of the first embodiment. Therefore, the dimension of the circuit board 18 in the sub-scan direction can be reduced, and the circuit board 18 can be downsized and lightened.

The reduction in the dimension of the circuit board 18 in the sub-scan direction can downsize and lighten the dimension of the image sensor unit 2 in the sub-scan direction.

The center position denotes a center position between sections farthest from each other (maximum outer shape) in the sub-scan direction on a contour line (outline) in plan view in the Z direction (in plan view of the surface provided with the light source 19 and the image sensor 21 of the circuit board 18). For example, the center position Cg of the light emitting portion 57 is an intermediate position between an outer shape O1 and an outer shape Or of the light emitting portion 57. The center position Ce of the light incident surface 52 is an intermediate position. Although the light incident surface 52 and the light emitting portion 57 may have local or partial projections and recesses, the center position here denotes a center position obtained by assuming that there are no projections and recesses.

Figure 12:
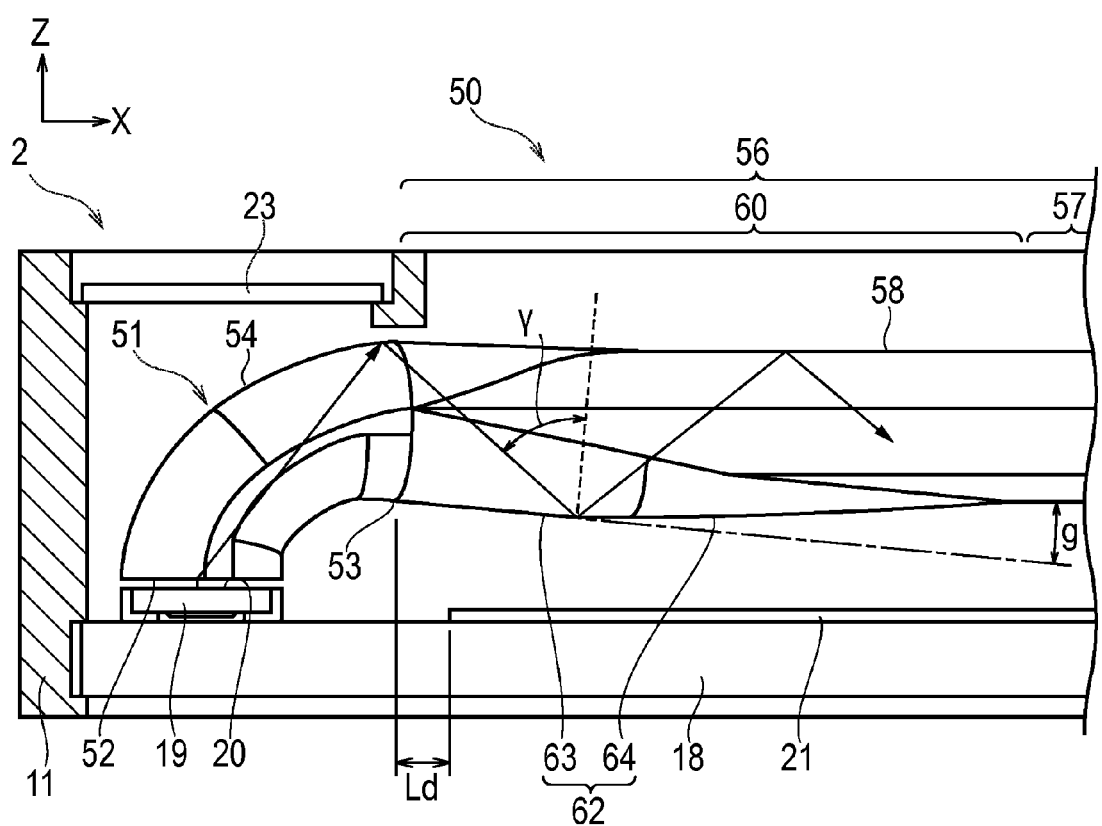
FIG. 12 is a sectional view of the image sensor unit viewed from the sub-scan direction according to the second embodiment.

An effect of the first inclined portion 63 will be described with reference to FIG. 12. FIG. 12 is a sectional view of the image sensor unit 2 viewed from the sub-scan direction according to the present embodiment. The light condenser 17 is not illustrated here.

Figure 13:
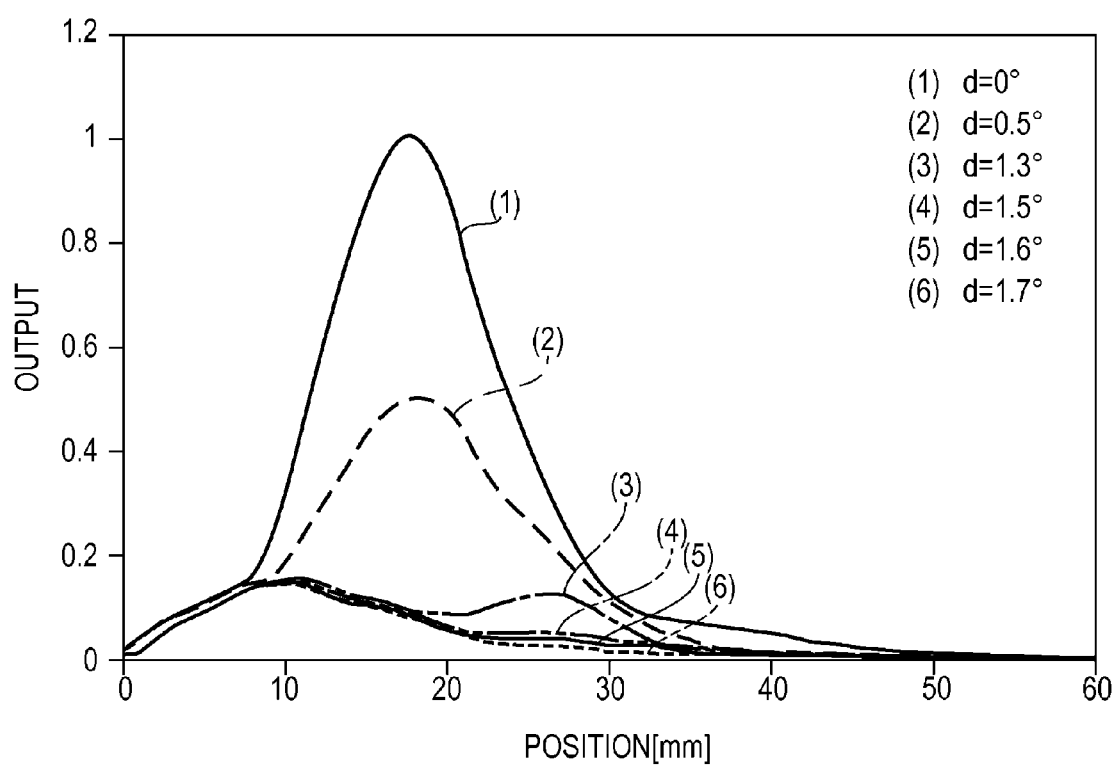
FIG. 13 is a graph illustrating changes in output values of an image sensor when the inclination angle of a light guide is changed.

As illustrated in FIG. 12, the light entered from the light source 19 to the curved portion 51 of the light guide 50 is completely reflected by the reflection surface 54 of the curved portion 51 and is propagated through the linear portion 56. The light propagated from the curved portion 51 through the linear portion 56 enters the first inclined portion 63. Since the first inclined portion 63 is inclined at the inclination angle g in the lower direction relative to the main-scan direction, the incident angle $\beta$ of the light incident on the first inclined portion 63 can be increased. More specifically, compared to the incident angle $\alpha$ of FIG. 17 without the formation of the first inclined portion 63, incident angle $\alpha$<incident angle $\gamma$ can be attained. The light changed by the first inclined portion 63 to have a large incident angle is reflected by the first inclined portion 63, and then the light with the large incident angle can enter the light emission surface 58. Therefore, as illustrated in FIG. 13 described later, most of the light reflected by the first inclined portion 63 is propagated in the main-scan direction of the light guide 50 without being emitted from the light emission surface 58. The light propagated in the main-scan direction of the light guide 50 is diffused based on the light diffusing pattern of the light diffusing surface 59 and is emitted from the light emission surface 58 to the original P. In this way, since the first inclined portion 63 can increase the incident angle $\gamma$ of the light incident on the first inclined portion 63, the light reflected by the first inclined portion 63 and not directly emitted from the light emission surface 58 is propagated in the longitudinal direction of the light guide. Therefore, the generation of unique light can be reduced, and the illuminance of the light emitted from the light guide 50 can be uniform throughout the main-scan direction.

An optimal inclination angle g of the first inclined portion 63 will be described.

The verified shape of the light guide is as follows in the light guide 50 illustrated in FIG. 9. The light incident surface 52 is shaped at La=3.5 mm, Lb=3.0 mm, and Ra=1.4 mm. The curved portion has an average radius of curvature Rb=6.5 mm. The curved portion 51 has an angle b=17°. The angle inclined in the lower direction relative to the main-scan direction of the axis portion with the combination of the upper coupling portion 61 and the lower coupling portion 62 is c=4°. The length of the first inclined portion 63 in the main-scan direction is Lc=5.1 mm. The length from the boundary portion 53 to the image sensor 21 illustrated in FIG. 12 is Ld=1.2 mm. While the angles for inclining the axis line C3 of the axis portion and the axis line L in the main-scan direction are c=4° and e=12°, the angle d for spreading is changed to (1) d=0°, (2) d=0.5°, (3) d=1.3°, (4) d=1.5°, (5) d=1.6°, and (6) d=1.7° in the simulation. The change in the angle d changes the inclination angle g of the first inclined portion 63. The light blocking member 23 is provided in the simulation to eliminate the influence of the leak light.

FIG. 13 is a graph comparing the brightness of the original when the angle d for spreading is changed. The horizontal axis indicates the position of the image sensor 21 in the main-scan direction. The position of "0 mm" on the horizontal axis is close to the light source 19. The vertical axis indicates output of the image sensor 21. More specifically, the image sensor 21 reads the reflection light when the light emitted from the light guide 50 illuminates the original, and the value is output. The output value indicates a value standardized by a maximum output value of the image sensor 21 at inclination angle d=0°.

As illustrated in FIG. 13, unique light emitted from the light emission surface 58 of the light guide 50 is detected at a specific position in the main-scan direction at angle d=0°.

On the other hand, the unique light decreases with an increase in the angle d, and the unique light is not detected at inclination angle d=1.7°. In this way, setting the inclination angle g of the first inclined portion 63 equal to or greater than a predetermined angle can reduce the generation of the unique light, and substantially uniform light can be emitted throughout the main-scan direction of the light guide 50. The use of the light guide 50 formed based on the inclination angle g (angle d=1.7°+inclination angle c=4° here) of the first inclined portion 63 can uniformly emit the light throughout the main-scan direction of the light guide 50 without significantly changing the image sensor unit 2.

The light guide 50 of the second embodiment has a similar effect to that of the first embodiment as a result of the formation of the first inclined portion 63. The curved portion 51 has a twisted shape in the light guide 50 of the second embodiment, and the light incident surface 52 of the light guide 50 can be arranged near the image sensor 21 in the sub-scan direction. Therefore, the dimension of the circuit board 18 in the sub-scan direction can be reduced, and the circuit board 18 can be downsized and lightened.

In the light guide 50 of the second embodiment, the coupling portion 60 is spread in a conical shape at the angle d in the main-scan direction from the boundary portion 53 so as to increase the sectional area in order to form the first inclined portion 63. In this case, the axial direction of the coupling portion 60 (axis portion with a combination of the upper coupling portion 61 and the lower coupling portion 62) is inclined in the lower direction at the angle c (angle c>angle d) relative to the main-scan direction. As a result, the position of the light emitting portion 57 is lowered, and the light guide 50 can be downsized. The second inclined portion 64 conversely inclined in the upper direction from the first inclined portion 63 is formed. As a result, the sectional area of the light emitting portion 57 can be reduced, and the light guide 50 can be downsized.

Third Embodiment

Figure 14:
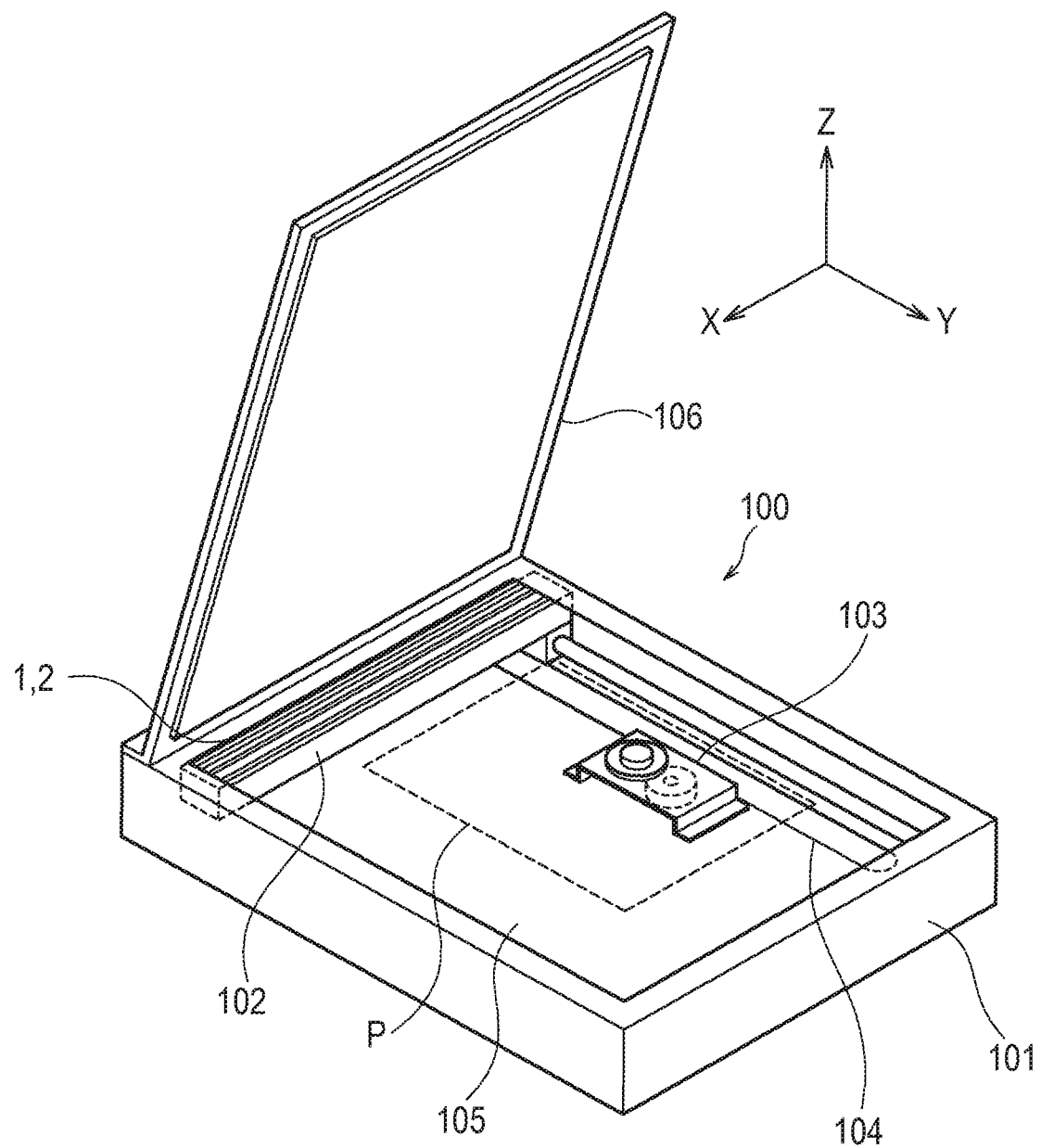
FIG. 14 is an external perspective view illustrating an image reading apparatus according to a third embodiment.

An image reading apparatus 100 according to the present embodiment will be described with reference to FIG. 14. The image sensor unit 1 or 2 according to the first or second embodiment is applied to the image reading apparatus 100 according to the present embodiment. FIG. 14 is an external perspective view of the image reading apparatus 100 according to the present embodiment. As illustrated in FIG. 14, the image reading apparatus 100 is a flat-bed type image scanner, and the image sensor unit 1 or 2 is incorporated. The image reading apparatus 100 includes a housing 101, a unit table 102, and a unit table driving mechanism. The unit table 102 is a member on which the image sensor unit 1 or 2 can be mounted. The unit table driving mechanism is a mechanism for moving, in the sub-scan direction, the unit table 102 on which the image sensor unit 1 or 2 is mounted. For example, the unit table driving mechanism includes a drive motor 103 and a wire 104 that transmits power of the drive motor 103 to the unit table 102. Configurations of the unit table 102 and the unit table driving mechanism are not particularly limited, and conventionally well-known configurations can be applied. An original supporting body 105 is provided on an upper surface of the housing 101. The original supporting body 105 can be a transparent glass plate, for example. A pressure plate 106 is further attached to an end of the housing 101 in the sub-scan direction through a hinge or the like, and the pressure plate 106 can be freely opened and closed. The pressure plate 106 has a function of holding the original P placed on an upper surface of the original supporting body 105.

Operation and usage of the image reading apparatus 100 are as follows. The original P is placed facing downward on the upper surface of the original supporting body 105, and the pressure plate 106 is closed. The drive motor 103 is driven to move the wire 104 to move the image sensor unit 1 or 2 in the sub-scan direction. As a result, the image sensor unit 1 or 2 moves in the sub-scan direction relative to the original P. While the image sensor unit 1 or 2 is moved, each reading line S of the image of the original P is read.

Since the image sensor unit 1 or 2 is applied to the image reading apparatus 100 according to the present embodiment, the light can be uniformly emitted throughout the main-scan direction. Particularly, the generation of unique light can be reduced for the original P. Therefore, even if part of the original P is floating, there is no luminance unevenness (density unevenness), and the image quality can be improved. The same configuration as that of a conventionally well-known image reading apparatus can be applied to parts of the image reading apparatus 100 according to the present embodiment that are not described.

Fourth Embodiment

Figure 15:
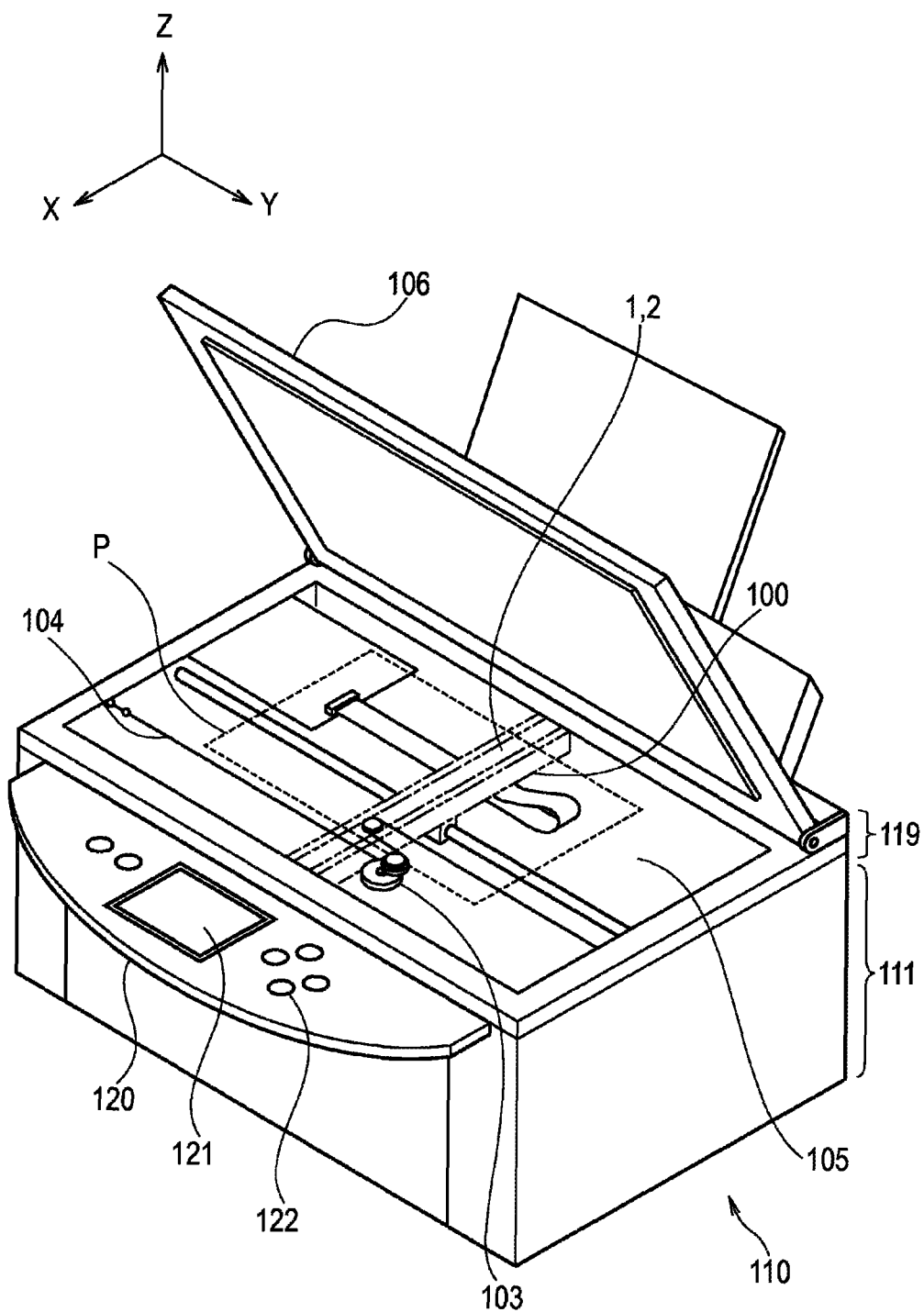
FIG. 15 is an external perspective view illustrating an image forming apparatus according to a fourth embodiment.
Figure 16:
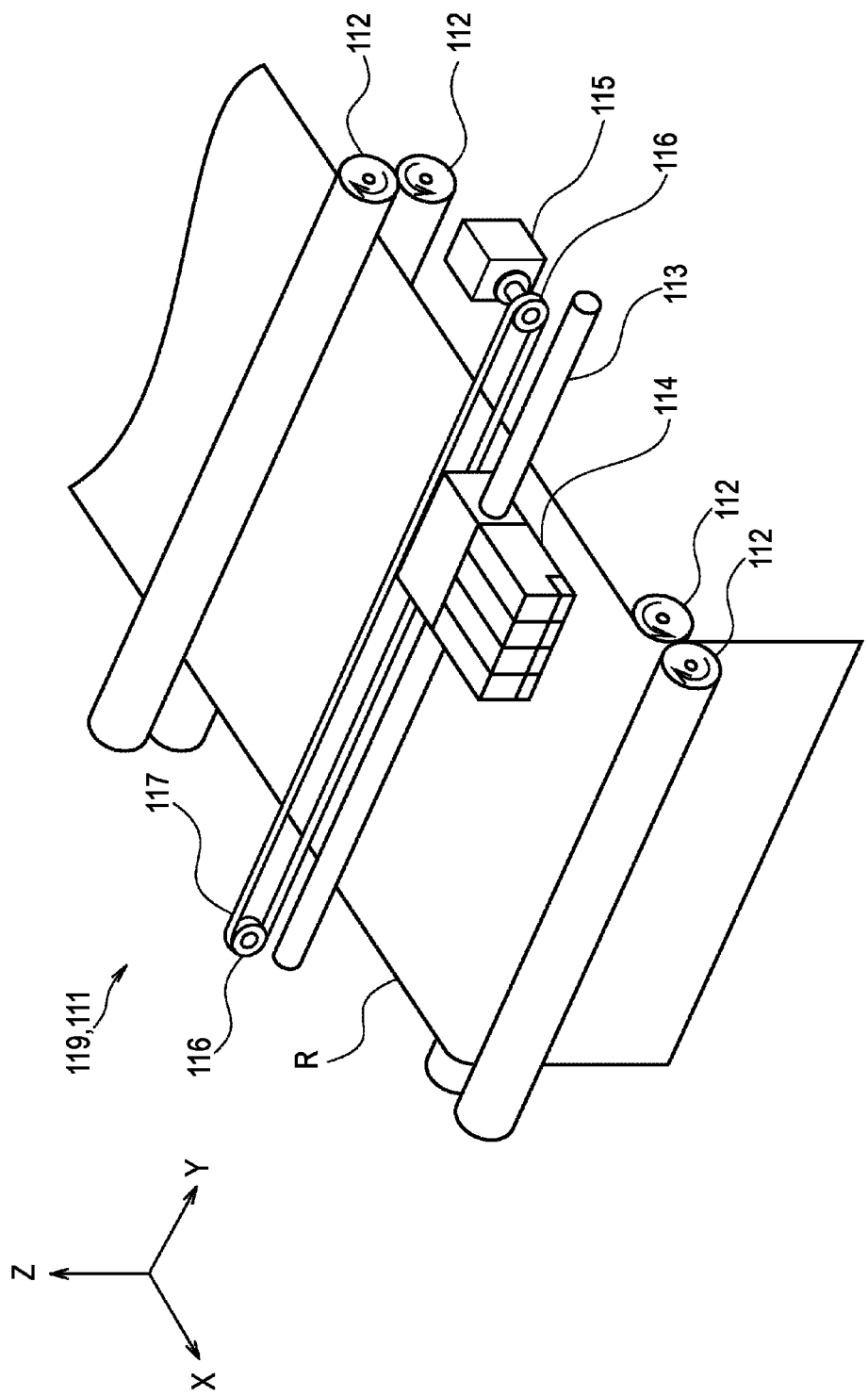
FIG. 16 is a perspective view illustrating a configuration of an image forming portion of the fourth embodiment.

An image forming apparatus 110 according to the present embodiment will be described with reference to FIGS. 15 and 16. The image sensor unit 1 or 2 according to the first or second embodiment is applied to the image forming apparatus 110 according to the present embodiment. FIG. 15 is an external perspective view of the image forming apparatus 110. FIG. 16 is a perspective view illustrated by extracting an image forming portion 111 provided in a housing of the image forming apparatus 110. As illustrated in FIGS. 15 and 16, the image forming apparatus 110 is a multi-function printer (MFP) as an example of a compound machine of a flat-bed type image scanner and an inkjet printer. The image forming apparatus 110 includes an image reading portion 119 that reads an image and the image forming portion 111 that forms an image. The image sensor unit 1 or 2 is incorporated into the image reading portion 119 of the image forming apparatus 110. Configurations common to those of the image reading apparatus 100 can be applied to the image reading portion 119 of the image forming apparatus 110. Therefore, the configurations common to those of the image reading apparatus 100 are designated with the same reference numerals, and the description will not be repeated.

As illustrated in FIG. 15, an operation portion 120 is provided on the image forming apparatus 110. The operation portion 120 includes: a display portion 121 that displays an operation menu, various messages, and the like; and various operation buttons 122 for operating the image forming apparatus 110.

As illustrated in FIG. 16, the image forming portion 111 is provided in the housing of the image forming apparatus 110. The image forming portion 111 includes conveyor rollers 112, a guide shaft 113, an inkjet cartridge 114, a motor 115, and a pair of timing pulleys 116. The conveyor rollers 112, rotated by driving force of a driving source, convey printing paper R as a recording medium in the sub-scan direction. The guide shaft 113 is a rod-like member and is fixed in the housing of the image forming apparatus 110 so that the axis line is parallel to the main-scan direction of the printing paper R. The inkjet cartridge 114 can slide over the guide shaft 113 to move back and forth in the main-scan direction of the printing paper R. One of the pair of timing pulleys 116 is attached to the rotation axis of the motor 115. The pair of timing pulleys 116 are provided at positions apart from each other in the main-scan direction of the printing paper R. A timing belt 117 is wound around the pair of timing pulleys 116 in parallel with the pair of timing pulleys 116, and a predetermined section is coupled to the inkjet cartridge 114.

The image reading portion 119 of the image forming apparatus 110 converts an image read by the image sensor unit 1 or 2 to an electric signal. The image forming portion 111 of the image forming apparatus 110 drives the conveyor rollers 112, the motor 115, and the inkjet cartridge 114 based on the electric signal converted by the image sensor unit 1 or 2 of the image reading portion 119 and forms an image on the printing paper R. In addition, the image forming portion 111 of the image forming apparatus 110 can form an image based on an electric signal input from the outside. The same configurations as those of various well-known printers can be applied to the configurations and operation of the image forming portion 111 in the image forming apparatus 110. Therefore, the details will not be described.

The image sensor unit 1 or 2 according to the first or second embodiment is applied to the image reading portion 119 in the image forming apparatus 110 according to the present embodiment. Therefore, the light can be uniformly emitted throughout the main-scan direction. Particularly, the generation of unique light can be reduced for the original P. Therefore, even if part of the original P is floating, there is no luminance unevenness (density unevenness), and the image quality can be improved.

Although the embodiments of the present invention have been described in detail, the embodiments just illustrate specific examples for carrying out the present invention, and the technical scope of the present invention is not limited to the embodiments. Various changes can be made to the present invention without departing from the spirit of the present invention. For example, the first and second embodiments can be appropriately combined.

The image reading apparatus according to the present invention is not limited to the image scanner with the configuration described in the embodiments. For example, the image reading apparatus can be a sheet-feed type image scanner. The image forming apparatus is not limited to the inkjet type, and any type, such as an electrophotographic type, a thermal transfer type, and a dot impact type, is possible. The image forming apparatus is not limited to the compound machine described in the embodiments. A copying machine and a facsimile, to which the image sensor unit according to the present invention is applied, are also included in the image reading apparatus of the present invention.

Although the curved portion of the light guide of the first and second embodiments has a curved shape as seen from the sub-scan direction, the shape is not limited to this. More specifically, it is only necessary that the light guide can reflect the light, which has entered from a direction different from the main-scan direction of the light guide, in the main-scan direction of the light guide and then emit the light from the light emission surface. For example, the curved portion of the light guide may have a bent shape.

Although the inclination is from the position near the boundary portion 33 toward the lower direction relative to the main-scan direction in the first embodiment, the inclination is not limited to this. Inclination from the boundary portion 33 directly toward the lower direction is also possible.

Although the inclination is from the boundary portion 53 directly toward the lower direction relative to the main-scan direction in the description of the second embodiment, the inclination is not limited to this. The inclination may be from a position close to the boundary portion 53 toward the lower direction.

Although the illumination apparatus including the light source 19 and the light guide 30 is used as a reflection reading light source for the original P, the illumination apparatus may be used as a transmission reading light source.

According to the present invention, light can be uniformly emitted in a longitudinal direction of a light guide even in the use of the light guide that can reflect light, which has entered from a direction different from the longitudinal direction of the light guide, in the longitudinal direction of the light guide and then emit the light from a light emission surface. Therefore, local luminance unevenness (density unevenness) can be reduced even if a partially floating object to be read is read.

It should be noted that the above embodiments merely illustrate concrete examples of implementing the present invention, and the technical scope of the present invention is not to be construed in restrictive manner by these embodiments. That is, the present invention may be implemented in various forms without departing from the technical spirit or main features thereof.

What is claimed is:

1. An illumination apparatus that emits light to an object to be read, the illumination apparatus comprising:
   a light source that emits light; and
   a light guide comprising: a curved portion comprising a light incident surface from which the light from the light source enters; and a linear portion comprising a light diffusing surface which diffuses light incident to a light emission surface and the light emission surface from which the light is emitted to the object to be read, the linear portion coupled to the curved portion and extended in a main-scan direction, the curved portion reflecting the light entered from the light incident surface to the linear portion,
   wherein the light guide comprises an inclined portion inclined in a direction that increases an incident angle of the light, the inclined portion formed in a range of the linear portion where the light reflected by the curved portion enters, and
   wherein a range of the inclined portion reduces in range until it transitions to the light diffusing surface.

2. The illumination apparatus according to claim 1, wherein
   part of the inclined portion is inclined from a boundary portion of the curved portion and the linear portion or from a position near the boundary portion to an opposite side of a side where the linear portion emits the light to the object to be read with respect to the main-scan direction.

3. The illumination apparatus according to claim 2, wherein
   the linear portion comprises: a light emitting portion that emits light to the object to be read; and a coupling portion that connects the curved portion and the light emitting portion and that comprises the inclined portion, and
   a cross-sectional shape of the coupling portion spreads in a conical shape from the boundary portion or from the position near the boundary portion.

4. The illumination apparatus according to claim 3, wherein
an axial direction of the coupling portion is inclined to an opposite side of a side where the light emitting portion emits the light to the object to be read with respect to the main-scan direction.

5. The illumination apparatus according to claim 4, wherein
an angle of the spread of the cross-sectional shape of the coupling portion in the conical shape from the boundary portion or from the position near the boundary portion is smaller than an angle of the inclination of the axial direction of the coupling portion to the opposite side of the side where the light emitting portion emits the light to the object to be read with respect to the main-scan direction.

6. The illumination apparatus according to claim 1, wherein
the linear portion comprises a light emitting portion that emits light to the object to be read,
the curved portion comprises a light incident surface from which the light from the light source enters, and
the curved portion is bent or curved so that a center position of the light incident surface is displaced from a center position of the light emitting portion as seen from the main-scan direction.

7. An image sensor unit that reads an object to be read, the image sensor unit comprising:
an illumination apparatus comprising: a light source that emits light; and a light guide comprising: a curved portion comprising a light incident surface from which the light from the light source enters; and a linear portion comprising a light diffusing surface which diffuses light incident to a light emission surface and the light emission surface from which the light is emitted to the object to be read, the linear portion coupled to the curved portion and extended in a main-scan direction, the curved portion reflecting the light entered from the light incident surface to the linear portion;
an image sensor that converts light from the object to be read to an electric signal;
a light condenser that forms an image of the light from the object to be read on the image sensor; and
a frame that houses the light source, the light guide, the image sensor, and the light condenser,
wherein the light guide comprises an inclined portion inclined in a direction that increases an incident angle of the light, the inclined portion formed in a range of the linear portion where the light reflected by the curved portion enters, and
wherein the inclined portion reduces in range until it transitions to the light diffusing surface.

8. The image sensor unit according to claim 7, wherein
part of the inclined portion is inclined from a boundary portion of the curved portion and the linear portion or from a position near the boundary portion to an opposite side of a side where the linear portion emits the light to the object to be read with respect to the main-scan direction,
the linear portion comprises: a light emitting portion that emits light to the object to be read; and a coupling portion that connects the curved portion and the light emitting portion and that comprises the inclined portion,
a cross-sectional shape of the coupling portion spreads in a conical shape from the boundary portion or from the position near the boundary portion, and
the curved portion of the light guide is bent or curved so that a center position of the light incident surface is arranged closer to the image sensor than a center position of the light emitting portion as seen from the main-scan direction.

9. An image reading apparatus that can read an object to be read, the image reading apparatus comprising:
an image sensor unit comprising: an illumination apparatus comprising: a light source that emits light; and a light guide comprising: a curved portion comprising a light incident surface from which the light from the light source enters; and a linear portion comprising a light diffusing surface which diffuses light incident to a light emission surface and the light emission surface from which the light is emitted to the object to be read, the linear portion coupled to the curved portion and extended in a main-scan direction, the curved portion reflecting the light entered from the light incident surface to the linear portion; an image sensor that converts light from the object to be read to an electric signal; a light condenser that forms an image of the light from the object to be read on the image sensor; and a frame that houses the light source, the light guide, the image sensor, and the light condenser, the light guide comprising an inclined portion inclined in a direction that increases an incident angle of the light, the inclined portion formed in a range of the linear portion where the light reflected by the curved portion enters and the inclined portion reducing in range until it transitions to the light diffusing surface,
wherein an image of the object to be read is read while the image sensor unit and the object to be read are relatively moved.

10. An image forming apparatus that can read an object to be read and that can form an image of the read object to be read in a recording medium, the image forming apparatus comprising:
an image reading portion comprising an image sensor unit comprising: an illumination apparatus comprising: a light source that emits light; and a light guide comprising: a curved portion comprising a light incident surface from which the light from the light source enters; and a linear portion comprising a light diffusing surface which diffuses light incident to a light emission surface and the light emission surface from which the light is emitted to the object to be read, the linear portion coupled to the curved portion and extended in a main-scan direction, the curved portion reflecting the light entered from the light incident surface to the linear portion; an image sensor that converts light from the object to be read to an electric signal; a light condenser that forms an image of the light from the object to be read on the image sensor; and a frame that houses the light source, the light guide, the image sensor, and the light condenser, the light guide comprising an inclined portion inclined in a direction that increases an incident angle of the light, the inclined portion formed in a range of the linear portion where the light reflected by the curved portion enters and the inclined portion reducing in range until it transitions to the light diffusing surface; and
an image forming portion that forms an image in the recording medium.

11. The illumination apparatus according to claim 1, wherein the inclined portion is formed in an arc-shape.

12. The illumination apparatus according to claim 1, wherein the inclined portion includes a first inclined portion and a second inclined portion, the first inclined portion reduces in range until it transitions to the second inclined portion and the second inclined portion reduces in range until it transitions to the light diffusing surface.

13. An illumination apparatus that emits light to an object to be read, the illumination apparatus comprising:
   a light source that emits light; and
   a light guide comprising: a curved portion comprising a light incident surface from which the light from the light source enters; and a linear portion comprising a light diffusing surface which diffuses light incident to a light emission surface and the light emission surface from which the light is emitted to the object to be read, the linear portion coupled to the curved portion and extended in a main-scan direction, the curved portion reflecting the light entered from the light incident surface to the linear portion,
   wherein the light guide comprises an inclined portion inclined in a direction that increases an incident angle of the light, the inclined portion formed in a range of the linear portion where the light reflected by the curved portion enters, and
   wherein the inclined portion is formed in an arc-shape.

14. The illumination apparatus according to claim 13, wherein
   part of the inclined portion is inclined from a boundary portion of the curved portion and the linear portion or from a position near the boundary portion to an opposite side of a side where the linear portion emits the light to the object to be read with respect to the main-scan direction.

15. The illumination apparatus according to claim 14, wherein
   the linear portion comprises: a light emitting portion that emits light to the object to be read; and a coupling portion that connects the curved portion and the light emitting portion and that comprises the inclined portion, and
   a cross-sectional shape of the coupling portion spreads in a conical shape from the boundary portion or from the position near the boundary portion.

16. The illumination apparatus according to claim 15, wherein
   an axial direction of the coupling portion is inclined to an opposite side of a side where the light emitting portion emits the light to the object to be read with respect to the main-scan direction.

17. The illumination apparatus according to claim 16, wherein
   an angle of the spread of the cross-sectional shape of the coupling portion in the conical shape from the boundary portion or from the position near the boundary portion is smaller than an angle of the inclination of the axial direction of the coupling portion to the opposite side of the side where the light emitting portion emits the light to the object to be read with respect to the main-scan direction.

18. The illumination apparatus according to claim 13, wherein
   the linear portion comprises a light emitting portion that emits light to the object to be read,
   the curved portion comprises a light incident surface from which the light from the light source enters, and
   the curved portion is bent or curved so that a center position of the light incident surface is displaced from a center position of the light emitting portion as seen from the main-scan direction.

19. The illumination apparatus according to claim 13, wherein the inclined portion includes a first inclined portion and a second inclined portion, the first inclined portion reduces in range until it transitions to the second inclined portion and the second inclined portion reduces in range until it transitions to the light diffusing surface.

* * * * *